US010990449B2

(12) United States Patent
Wang et al.

(10) Patent No.: US 10,990,449 B2
(45) Date of Patent: Apr. 27, 2021

(54) MANAGING APPLICATION RELATIONSHIPS IN MACHINE-TO-MACHINE SYSTEMS

(71) Applicant: Convida Wireless, LLC, Wilmington, DE (US)

(72) Inventors: Chonggang Wang, Princeton, NJ (US); Qing Li, Princeton Junction, NJ (US); Hongkun Li, Malvern, PA (US); Zhuo Chen, Claymont, DE (US); Tao Han, North Arlington, NJ (US); Paul L. Russell, Jr., Pennington, NJ (US)

(73) Assignee: Convida Wireless, LLC, Wilmington, DE (US)

( * ) Notice: Subject to any disclaimer, the term of this patent is extended or adjusted under 35 U.S.C. 154(b) by 59 days.

(21) Appl. No.: 15/522,959

(22) PCT Filed: Oct. 30, 2015

(86) PCT No.: PCT/US2015/058344
§ 371 (c)(1),
(2) Date: Apr. 28, 2017

(87) PCT Pub. No.: WO2016/070064
PCT Pub. Date: May 6, 2016

(65) Prior Publication Data

US 2017/0337088 A1 Nov. 23, 2017

Related U.S. Application Data

(60) Provisional application No. 62/073,582, filed on Oct. 31, 2014.

(51) Int. Cl.

| | |
|---|---|
| ***G06F 9/50*** | (2006.01) |
| ***G06F 8/20*** | (2018.01) |
| ***G06F 9/54*** | (2006.01) |

(52) U.S. Cl.
CPC .............. *G06F 9/5027* (2013.01); *G06F 8/20* (2013.01); *G06F 9/541* (2013.01); *G06F 9/54* (2013.01)

(58) Field of Classification Search
None
See application file for complete search history.

(56) References Cited

U.S. PATENT DOCUMENTS 9,760,843 B1 * 9/2017 Martin .................. G06Q 30/04
2001/0051946 A1 * 12/2001 Nishikawa ............ G06F 16/288
(Continued)

FOREIGN PATENT DOCUMENTS

CN 1551589 A 12/2004
CN 101377737 A 3/2009
(Continued)

OTHER PUBLICATIONS

International Patent Application No. PCT/US2015/058344: International Preliminary Report on Patentability dated May 2, 2017, 7 pages.
(Continued)

*Primary Examiner* — Meng Ai T An
*Assistant Examiner* — Zujia Xu
(74) *Attorney, Agent, or Firm* — BakerHostetler

(57) ABSTRACT

Application relationships may be categorized and managed at a service layer, such as creating application relationship, updating application relationship, retrieving application relationship, deleting application relationship, or discovering application relationship. Services may be based on application relationship awareness.

15 Claims, 28 Drawing Sheets

(56) References Cited

U.S. PATENT DOCUMENTS

| | | | | |
|---|---|---|---|---|
| 2002/0191452 | A1* | 12/2002 | Fujihara | G06F 16/9027 365/200 |
| 2004/0216122 | A1 | 10/2004 | Gram et al. | |
| 2004/0230687 | A1* | 11/2004 | Nakamura | H04L 29/06 709/228 |
| 2005/0132381 | A1 | 6/2005 | Fiammante et al. | |
| 2006/0015848 | A1* | 1/2006 | Schwarzmann | G06F 9/4492 717/116 |
| 2008/0104084 | A1* | 5/2008 | Chavda | H04L 51/12 |
| 2009/0049422 | A1 | 2/2009 | Hage et al. | |
| 2013/0013555 | A1 | 1/2013 | Foti | |
| 2014/0007003 | A1 | 1/2014 | Aibara | |
| 2014/0282189 | A1* | 9/2014 | Bansal | G06F 3/04847 715/771 |
| 2016/0007137 | A1* | 1/2016 | Ahn | H04W 4/70 370/254 |
| 2016/0219125 | A1* | 7/2016 | Xiao | H04W 4/70 |
| 2017/0142614 | A1* | 5/2017 | Wu | H04W 68/005 |
| 2017/0337088 | A1 | 11/2017 | Wang et al. | |

FOREIGN PATENT DOCUMENTS

| | | | |
|---|---|---|---|
| CN | 102186164 | A | 9/2011 |
| CN | 102467672 | A | 5/2012 |
| CN | 102547686 | A | 7/2012 |
| CN | 102804738 | A | 11/2012 |
| CN | 103200209 | A | 7/2013 |
| CN | 103596117 | A | 2/2014 |
| CN | 103596118 | A | 2/2014 |
| CN | 103618800 | A | 3/2014 |
| CN | 103947157 | A | 7/2014 |
| CN | 104035804 | A | 9/2014 |
| EP | 3213205 | A1 | 9/2017 |
| JP | 2003-076958 | A | 3/2003 |
| JP | 2004-348715 | A | 12/2004 |
| JP | 2014-010512 | A | 1/2014 |
| JP | 2017-533523 | A | 11/2017 |
| WO | 2013/012265 | A2 | 1/2013 |
| WO | 2014/129802 | A1 | 8/2014 |
| WO | 2016/070064 | A1 | 5/2016 |

OTHER PUBLICATIONS

OneM2M TS-0001 V0.4.3, “Functional Architecture Baseline Draft”, Technical Specification, Mar. 27, 2014, 303 pages.

OneM2M TS-0001 V-2014-08, “oneM2M Functional Architecture Baseline Draft”, Aug. 1, 2014, 297 pages.

Wikipedia, Service-Oriented Architecture, Jan. 29, 2016, 16 pages, http://en.wikipedia.org/w/index.php?title=Service-Oriented Architecture &oldid=629958032.

OneM2M TS-0004 V0.4.0, “Service Layer Protocol Core Specification”, Technical Specification, Apr. 22, 2014, 43 pages.

English Translation of JP Office Action dated Jul. 13, 2018 for JP Application No. 2017523503.

* cited by examiner

350

352

Application Relationship Records

| Application Relationship Record Identifier | Application Relationship Type | List of Applications | Primary Applications | Relationship Lifetime |
|---|---|---|---|---|
| <URI1> | Parent/Child | AE 151, AE 152, AE 153 | AE151 | 60 minutes |
| <URI2> | Composition/Input | AE 156, AE 154, AE 155 | AE 156 | 10 days |

354

MANAGING APPLICATION RELATIONSHIPS IN MACHINE-TO-MACHINE SYSTEMS

CROSS-REFERENCE TO RELATED FIELD

This application is a National Stage Application filed under 35 U.S.C. § 371 of International Application No. PCT/US2015/058344, filed Oct. 30, 2015, which claims priority to U.S. Provisional Patent Application No. 62/073,582, filed Oct. 31, 2014, entitled "MANAGING APPLICATION RELATIONSHIPS IN MACHINE-TO-MACHINE SYSTEMS," the aforementioned application is incorporated herein by reference in its entirety.

BACKGROUND

OneM2M Functional Architecture Baseline (oneM2M-TS-0001-V-2014-08 which is incorporated by reference in its entirety) specifies a common service layer (CSL) that can be readily embedded within various hardware and software to support different machine-to-machine (M2M) applications such as connected cars or smart health, among other things. oneM2M as a CSL defines a set of common service functions (CSFs) (e.g., registration CSF). An instantiation of a set of one or more particular types of CSFs is referred to as a common services entity (CSE) which can be hosted on different types of network nodes (e.g., infrastructure node, middle node, or application-specific node).

FIG. 1 illustrates the oneM2M functional architecture. Application entity (AE) 101 or AE 103, refers to different M2M applications, which may reside in infrastructure domain 107 or field domain 105, respectively. The field domain 107 "consists of M2M Devices, M2M Gateways, Sensing and Actuation (S&A) Equipment and M2M Area Networks", while the infrastructure domain 105 "consists of Application Infrastructure and M2M Service Infrastructure" according to oneM2M-TS-0011-Definitions and Acronyms-V0.7.0. AE 101 can access and leverage CSFs in CSE 109 via Mca interface 108. In addition, CSE 109 provides a suite of CSFs and CSE 109 can communicate with another CSE 111 via Mcc interface 110. CSE 109 can also leverage network service entity (NSE) 113 from underlying networks via Mcn interface 112.

According to oneM2M Functional Architecture Baseline, oneM2M reference points include Mca 108, Mcc 110, Mcc' 114, and Mcn 112. Mca reference point 108 (also known as Mca interface) designates communication flows between an AE (e.g., AE 101) and a CSE (e.g., CSE 109). Mca reference point 108 allows AE 101 to use the services provided by CSE 109, and for CSE 109 to communicate with AE 101. Mcc reference point 110 designates communication flows between two CSEs (e.g., CSE 109 and CSE 111). Mcc reference point 110 allows CSE 109 to use the services of CSE 111 in order to provide needed functionality. The services offered via Mcc reference point 110 are dependent on the functionality supported by CSE 109 and CSE 111.

Mcc' reference point 114 designates communication flows between two CSEs in infrastructure nodes that are oneM2M compliant and that resides in different M2M SP domains. Hence, it allows CSE 111 of infrastructure node 105 residing in the Network Domain of an M2M Service Provider to communicate with a CSE of another infrastructure node (not shown) residing in the Network Domain of another M2M Service Provider 115 to use its services, and vice versa. Mcn reference point 112 designates communication flows between CSE 109 and underlying NSE 113. Mcn reference point 112 allows CSE 109 to use the services (other than transport and connectivity services) provided by the underlying NSE 113 in order to provide the needed functionality.

A few common service functions (CSFs) have been defined within CSE 109 or CSE 111 in oneM2M Functional Architecture Baseline that include the Registration (REG) CSF, Application and Service Layer Management (ASM) CSF, Device Management (DM) CSF, Data Management and Repository (DMR) CSF, Communications and Message Delivery Handling (CMDH) CSF, Service Charging and Accounting (SCA) CSF, etc. For example, a CSE (e.g., an M2M service layer entity) provides REG CSF so that an AE can first register itself to the CSE, in order to leverage other CSFs provided by the CSE. This architecture allows multiple AEs to independently register with the same CSE. After the registration is successful, the CSE creates a separate resource (e.g., <application> resource) for each AE. Conventional oneM2M Functional Architecture Baseline lack functions to support the relationship among different applications.

SUMMARY

The conventional oneM2M architecture supports resource access and message exchanges between different M2M applications (e.g., AEs). This architecture allows multiple AEs to register with the same CSE, but each AE performs application registration independently to the CSE. Conventional M2M/IoT service layers (e.g., oneM2M Functional Architecture Baseline, oneM2M-TS-0001-V-2014-08) lack functions to efficiently support and leverage the relationship among different applications. Disclosed herein is how to utilize application relationships (e.g., parent/child) in M2M or IoT service layers.

Discussed herein is application relationship categorization and application relationship management as a common service at a service layer, such as creating application relationship, updating application relationship, retrieving application relationship, deleting application relationship, or discovering application relationship. Services may be based on application relationship awareness.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

DETAILED DESCRIPTION

The conventional oneM2M architecture focuses on defining various CSFs including their essential functionalities and how they should be implemented and leveraged by other CSEs or AEs. The conventional oneM2M architecture also supports resource access and message exchanges between different M2M applications (e.g., AEs). This architecture allows multiple AEs to register with the same CSE, but each AE performs application registration independently to the CSE. Conventional M2M/IoT service layers (e.g., oneM2M Functional Architecture Baseline, oneM2M-TS-0001-V-2014-08) lack functions to efficiently support and leverage the relationship among different applications. Disclosed herein is how to utilize application relationships (e.g., parent/child) in M2M or IoT service layers (hereinafter "M2M service layers").

M2M use cases may include smart transportation, smart home, smart health, smart grid, smart cities, etc. Each use case may generate multiple relevant applications at both an infrastructure domain (e.g., in an M2M application server) and a field domain (e.g., in an M2M Device). Those M2M applications are not completely independent of each other, even for applications from different vertical domains. A gym use case and environment monitoring use case described below demonstrate that relationships may exist among different M2M applications.

Figure 2:
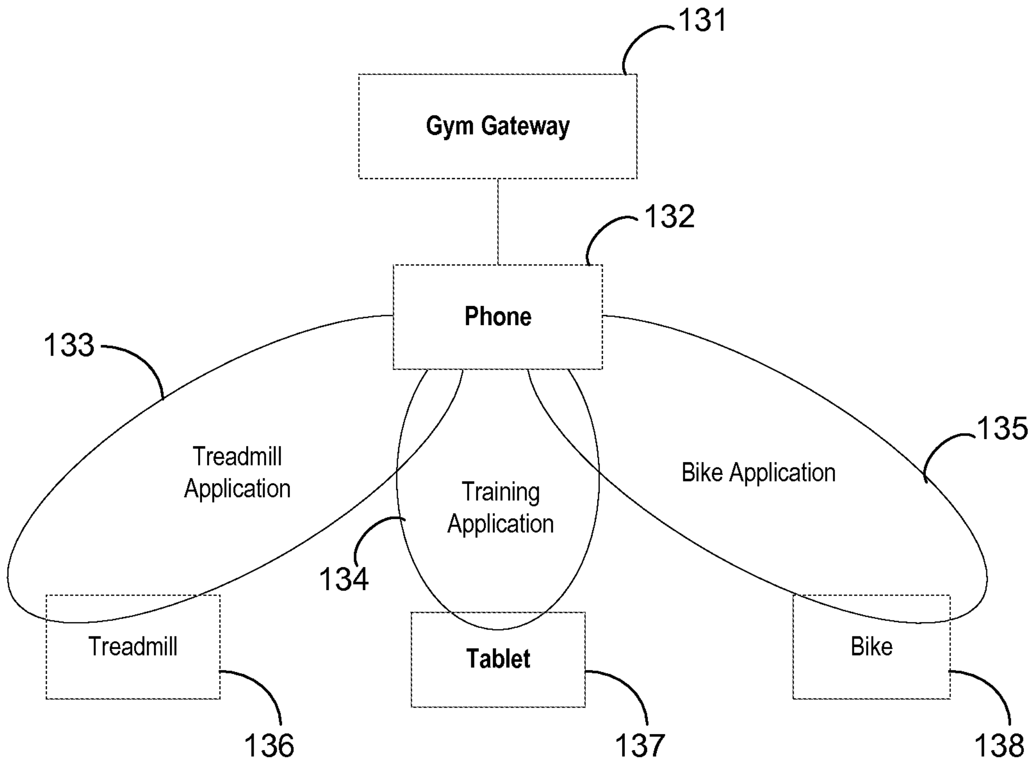
FIG. 2 illustrates an exemplary gym use case.

FIG. 2 illustrates a gym use case where there are three applications on a customer's mobile device, in which there may be parent/child relationships. AE 134 is a training application between mobile device 132 and tablet 137 (e.g., the coach). AE 133 is a treadmill application between mobile device 132 and the treadmill 136. AE 135 is a bike application between mobile device 132 and bike 138. AE 133, AE 134, and AE 135 register themselves to gym gateway 131 (e.g., an oneM2M CSE). AE 134 is used to access a training regimen from tablet 137. Then the customer uses AE 133 or AE 135 for interactions with the equipment (e.g., treadmill 136 and bike 138) which is designated in the training program as provided by AE 134. For example, the customer can send commands to dynamically slow down or speed up treadmill 136 via AE 133. In this example, AE 134 may be considered a parent application, which provides information (e.g., training program) to AE 133 and AE 135. AE 133 and AE 135 may be regarded as child applications and both may provide training results as feedback to AE 134. In addition, AE 134 may have access rights to control and even override the operations of AE 133 or AE 135.

Figure 3:
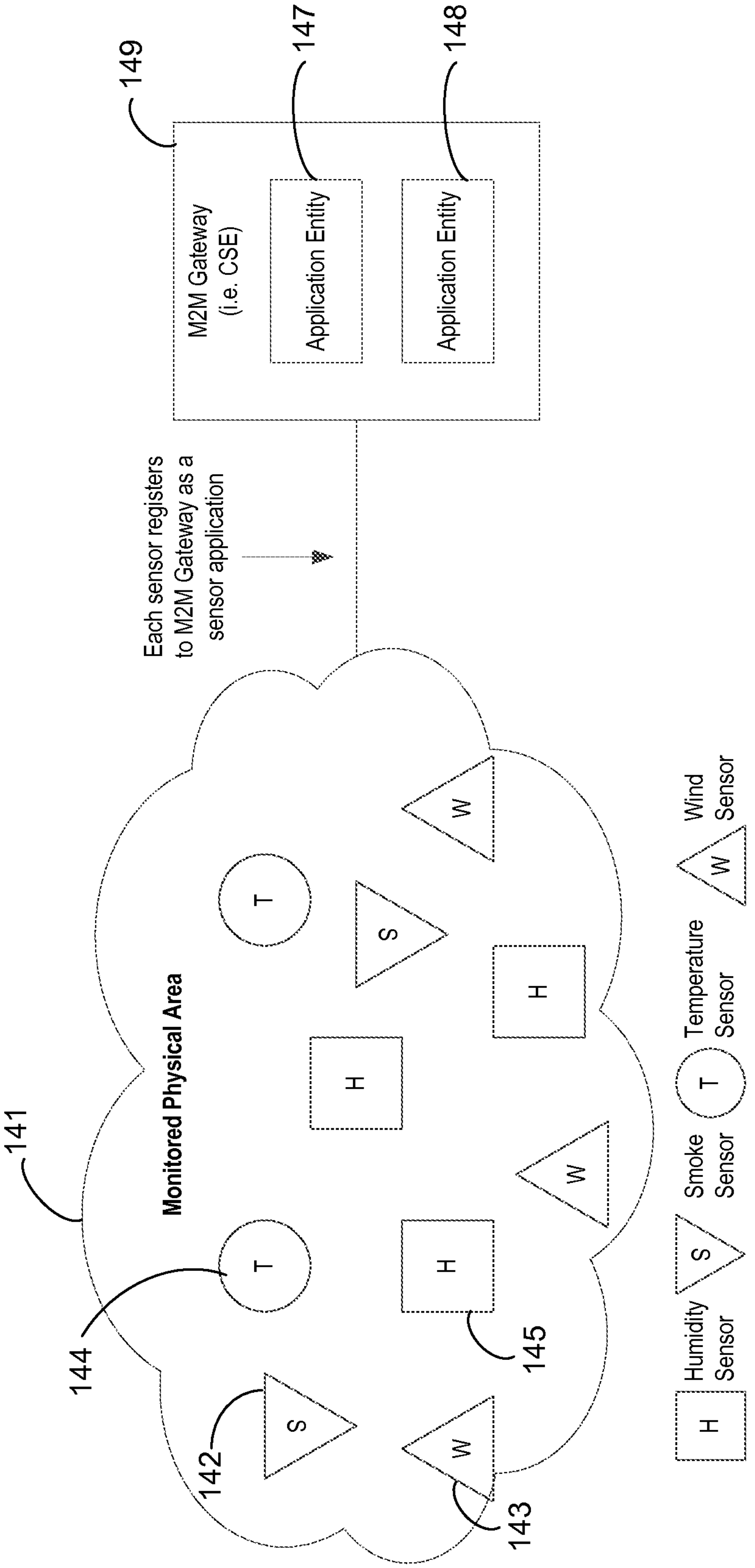
FIG. 3 illustrates an exemplary environment monitoring use case.

FIG. 3 illustrates a use case for environment monitoring that includes an example of a composition/input relationship. In FIG. 3, a few types of sensors (e.g., humidity sensor 145, smoke sensor 142, temperature sensor 144, and wind sensor 143) are deployed in a physical area 141. The sensors may be placed in different locations with different density. Each sensor registers itself to M2M gateway 149 as a sensor application. Sensors may be accessed from the Internet through M2M gateway 149.

With continued reference to FIG. 3, in one deployment, M2M gateway 149 may install two gateway applications (e.g., AE 147 and AE 148) for different purposes, but both may be dependent on sensor applications. For example, AE 147 may utilize a combination of a humidity sensor application of humidity sensor 145 and a temperature sensor application of temperature sensor 144 for weather prediction. While AE 148 may utilize a combination of a temperature sensor application of temperature sensor 144, a smoke sensor application of smoke sensor 142, and a wind sensor application of wind sensor 143 for fire prediction. The sensor applications are inputs on which the gateway applications (composite applications) depend on for generating output. Individual sensor applications may be utilized by other network applications from the Internet.

Conventional M2M service layers (e.g., OneM2M Functional Architecture Baseline, oneM2M-TS-0001-V-2014-08) lack functions to efficiently support and utilize the relationship among different applications. In conventional oneM2M, M2M applications (e.g., AEs) simply register to the service platform (e.g., CSE) independently via Mca interface and communicate with other M2M applications via Mca or the combination of Mca/Mcc/Mca interfaces. The dependency or relationship among M2M applications is not supported in application registration or other application-related procedures (e.g., application subscription) in oneM2M architecture.

Application relationship unawareness at a conventional M2M service layer may have multiple shortcomings. First, to support use cases with application relationship inherited or required (e.g., gym use case of FIG. 2), a conventional M2M service layer provides no corresponding service, but relies on applications themselves to handle it at the application level, which may increase the burden for the application, for example increased application development complexity and decreased software reusability. Second, for a conventional M2M service layer dynamic change in application relationship may not be efficiently supported by applications themselves.

As disclosed herein, common services at the M2M service layer (e.g., registration services at oneM2M) may be enhanced (e.g., a reduction of message overhead) when the relationships of different applications are managed. Application relationship management may entail a common service layer function creating application relationships, updating application relationships, retrieving application relationships, deleting application relationships, or discovering application relationships, among other things.

Figure 4A:
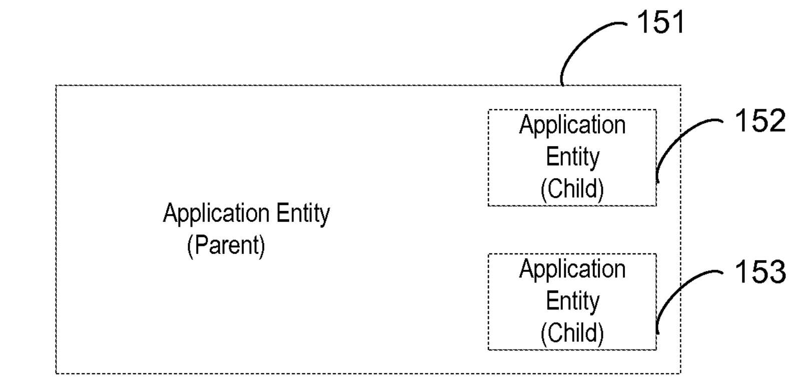
FIG. 4A illustrates an exemplary parent/child application relationship.

FIG. 4A illustrates an exemplary parent/child relationship. AE 152 and AE 153, as child applications, are part of the parent application, AE 151. AE 151 may have substantial access to and control of AE 152 and AE 153. Registration of child applications, AE 152 and AE 153, may rely on the successful registration of the parent application, AE 151. AE 151 may be registered or activated before AE 152 and AE 153. Alternatively, the parent/child relationship may be established after AE 151, AE 152, and AE 153 register independently. For example, AE 152 and AE 153 may be allowed to register even though the parent application, AE 151, is not yet registered, however certain functionality of AE 152 and AE 153 (e.g., access rights) may not be applicable or enabled. Once AE 151 registers, AE 152 and AE 153 may discover AE 151 and establish a relationship with AE 152 and AE 153. Accordingly, the disabled functionality may then be enabled. On the other hand, child applications, AE 152 and AE 153, may be removed automatically when the parent application, AE 151, is deleted or de-registered. Both the parent application, AE 151, and child applications, AE 152 and AE 153, may register to the same local service layer instance, but may or may not reside on the same physical M2M device, gateway, or server. In summary, parent application, AE 151, may substantially control child applications, AE 152 and AE 153, and AE 152 and AE 153 may rely on and serve AE 151. It is contemplated herein that the parent application may have any number of child applications.

Figure 4B:
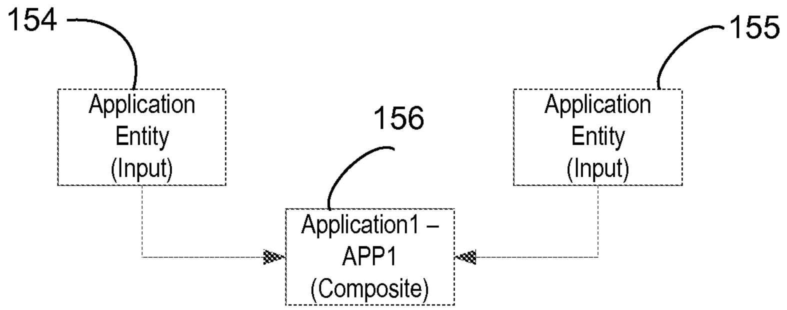
FIG. 4B illustrates an exemplary composition/input application relationship.

FIG. 4B illustrates an exemplary composition/input relationship. AE 156 is built up on AE 154 and AE 155, which are referred to as input applications. AE 156 relies on AE 154 and AE 155 for inputs or resources, but it does not have substantial control over them. AE 156 may be referred to as the composite application. For example, the composite application, AE 156, may access resources of input applications, AE 154 and AE 155, but the removal or de-registration of AE 156 may not lead to the automatic deletion of AE 154 or AE 155. However, the removal or de-registration of AE 154 or AE 155 has impact on the composite application, AE 156. Generally, a composite application may have multiple input applications and a composite application may be an input application to another composite application.

Figure 5A:
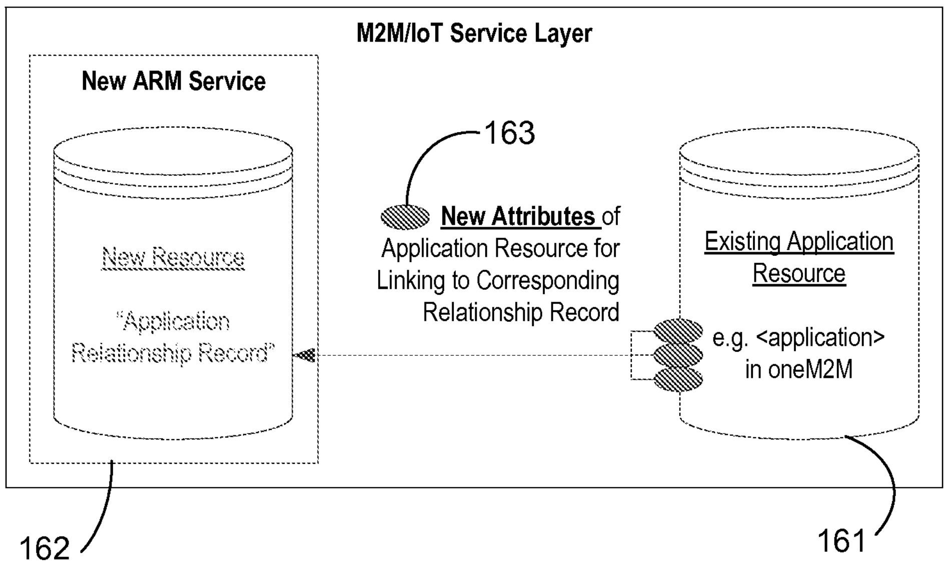
FIG. 5A illustrates an exemplary application relationship record resource.
Figure 5B:
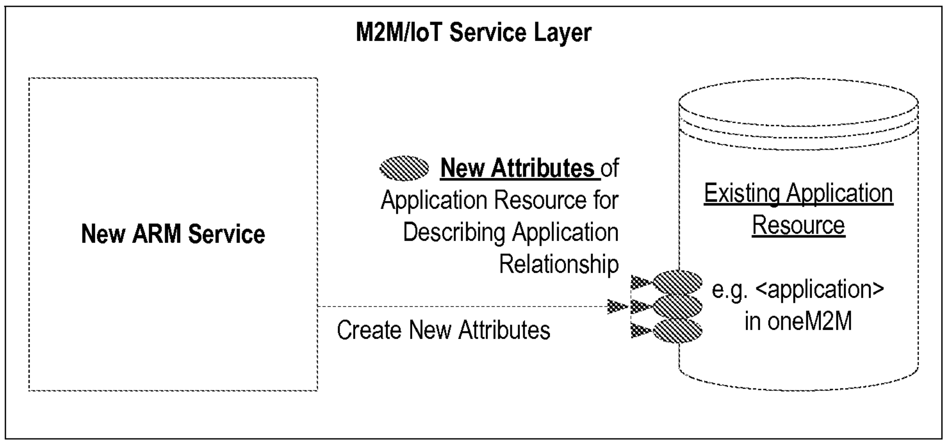
FIG. 5B illustrates an exemplary application relationship record resource.

FIG. 5A and FIG. 5B illustrate approaches for describing and linking application resource and corresponding relationship. FIG. 5A illustrates an approach with a special application relationship record resource for linking. As shown in FIG. 5A, each application relationship may be created and captured as an application relationship record by an application relationship management (ARM) function. As disclosed in more detail herein, ARM maintains a special database for storing application relationship records. Then new attributes (e.g., linking) is introduced for an application to link to corresponding relationship records, which describe its relationship with other applications. The application relationship record database is maintained at the service layer by the ARM. The database is a generic function, which can be accessed or leveraged by different applications. The ARM may have control of the records that may be accessed or shared with an application. For example, an application, after registering itself with the service layer can search the database for a particular application relationship record about other applications. In another example, the application may update the database by adding a new application relationship record to show its relationship with another application.

FIG. 5B illustrates an approach without a special application relationship record resource. Each application relationship is created as extra information or attributes which are attached to corresponding application resource. For example, application relationship can be described by adding new attributes to <application> resource in the context of oneM2M architecture. In this approach, the ARM does not need to maintain any relationship record as in Approach 1 of FIG. 5A.

With continued reference to the approach of FIG. 5B, optionally, an existing application resource (e.g., an <application> in oneM2M) can be added as a sub-resource of another application resource (e.g., another <application> in oneM2M) to form a hierarchical structure of application resources, which implies application relationship and may not need new attributes to explicitly show application relationship. Note that an application may be restricted from adding its parent application as its sub-resource (e.g., child application). To achieve this restriction the application can check the whole hierarchical structure to guarantee that the new sub-resource (e.g., child application) to be added does not appear on the hierarchical structure. Note that the depth of the hierarchical structure could be limited in order to avoid potential loop relationship.

With regard to the application relationship record, the service layer (e.g., ARM service) may be responsible for maintaining application relationship records. The application relationship record may optionally be added as sub-resource or attributes of an application resource. As shown in Table 1, each application relationship record may include fields, such as the application relationship record identifier (ARRI) field, application relationship type field, list of applications field, primary applications field, relationship lifetime field, or list of allowed entities field, among other things. ARRI is the identifier of each application relationship record. It may be a universal resource identifier (URI) that indicates where the record is stored and can be accessed. An application involved in an application relationship can add one or more ARRIs as its attributes, so that all application relationships about an application can be retrieved based on ARRIs.

TABLE 1

| Application Relationship Records | | | | |
|---|---|---|---|---|
| Application Relationship Record Identifier | Application Relationship Type | List of Applications | Primary Application | Relation-ship Lifetime |
| <URI1> | Parent/Child | AE 151, AE 152, AE 153 | AE 151 | 60 minutes |
| <URI2> | Composition/Input | AE 156, AE 154, AE 155 | AE 156 | 10 days |

Table 1 shows different fields that may be used for application relationship records. An application relationship type field indicates the type of application relationship (e.g., parent/child relationship or composition/input relationship). This parameter may be extended to cover other relationship types. The list of applications field includes the names, labels, or identifiers of all applications directly in a relationship. The identifier may be in the form of a URI. The primary application field indicates the name, label, or identifier of the parent application for parent/child relationship or composite application for composition/input relationship. Relationship lifetime field indicates the lifetime of the application relationship. The list of allowed entities field (not explicitly shown in Table 1) is the list of applications or other M2M entities (e.g., M2M/IoT servers, gateways, devices, etc.) that are allowed to access the application relationship record. The ARM service may use one "list of allowed entities" for the entire application relationship record database.

Table 1 shows two example application relationship records in accordance with FIG. 4A and FIG. 4B. The first record of Table 1, which corresponds with FIG. 4A, may be accessed via <URI1>. In this application relationship, AE 151 is the parent application while AE 152 and AE 153 are child applications. The second record of Table 1, which corresponds to FIG. 4B, may be accessed via <URI2>. In this application relationship, AE 156 is the composite application, while AE 154 and AE 155 are input applications.

Figure 24:
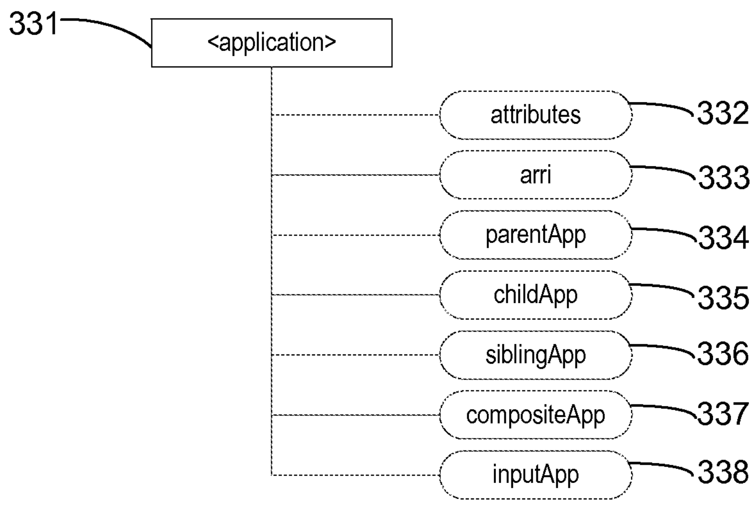
FIG. 24 illustrates a structure of <application> resource.
Figure 25:
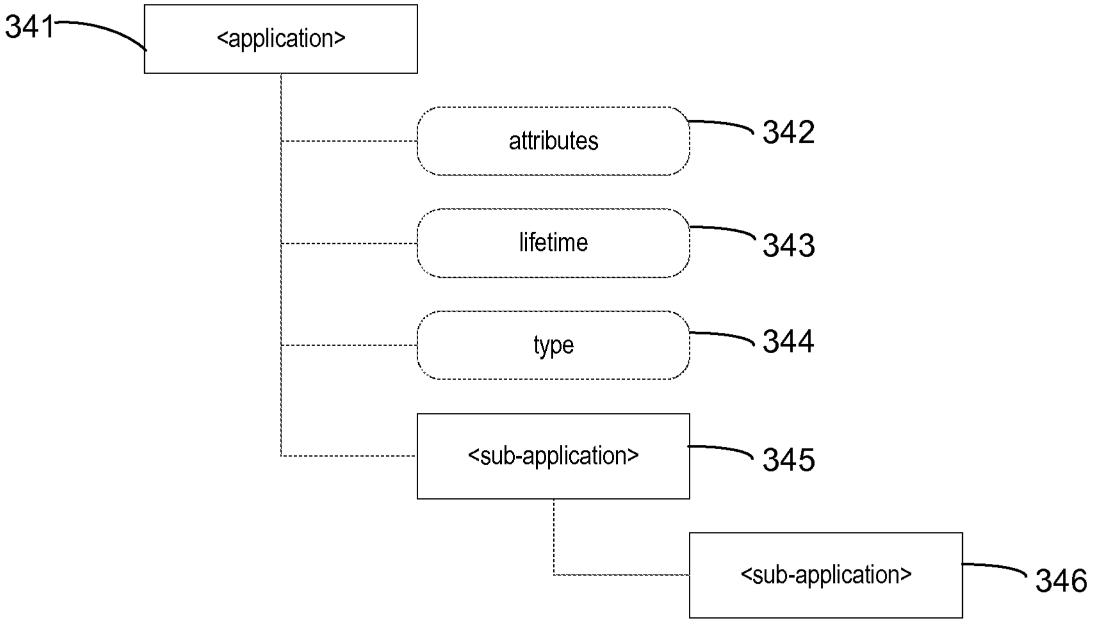
FIG. 25 illustrates a structure of <application> resource.

Application relationship attributes (ARAs) may be defined to describe relationships that an application may have with other applications. The ARAs may be added as attributes for each application resource (e.g., <application> in oneM2M as shown in FIG. 24 and FIG. 25) and in turn each attribute may have an address (e.g., URI) through which it may be accessed. For example, an ARA may include parentApp, childApp, siblingApp, inputApp, compositeApp, or relationshipLifetime. A parentApp may be the list of parent application names or identifiers, a childApp may be a list of child application names or identifiers, siblingApp may be a list of sibling application names or identifiers, inputApp may be a list of input application names or identifiers, compositeApp may be a list of composite application names or identifiers, and relationshipLifetime may be a list of lifetime information, wherein each lifetime is for an individual application relationship.

Since M2M applications register themselves with the service layer (e.g., oneM2M CSE), the service layer may be used to manage application relationship. The application relationship management (ARM) service may be considered a new common service at an M2M service layer to facilitate performing generic operations in order to manage relationships among existing or newly registered applications. The operations may include creating a new application relationship, retrieving an existing application relationship, updating an existing application relationship, deleting an existing application relationship, and discovery of an existing application relationship. Even though the ARM service is related to application relationship, it may provide generic functions that may support and may be used by various applications because 1) the herein disclosed types of application relationships are generic enough (not specific to different applications), and 2) the aforementioned generic ARM operations do not depend on particular applications and are generic as well.

A generic operation my involve creating a new application relationship. For example, an M2M/IoT Server (hereinafter M2M server) may help to create a parent/child or composition/input relationship for two or more applications that were registered to the M2M server. Accordingly, a new application relationship record is added into the application relationship record database maintained by the M2M server according to the approach of FIG. 5A, or new attributes/links will be created for other involved applications according to the approach of FIG. 5B. These processes may be used for retrieving, updating, deleting, and discovering existing application relationships.

Figure 27A:
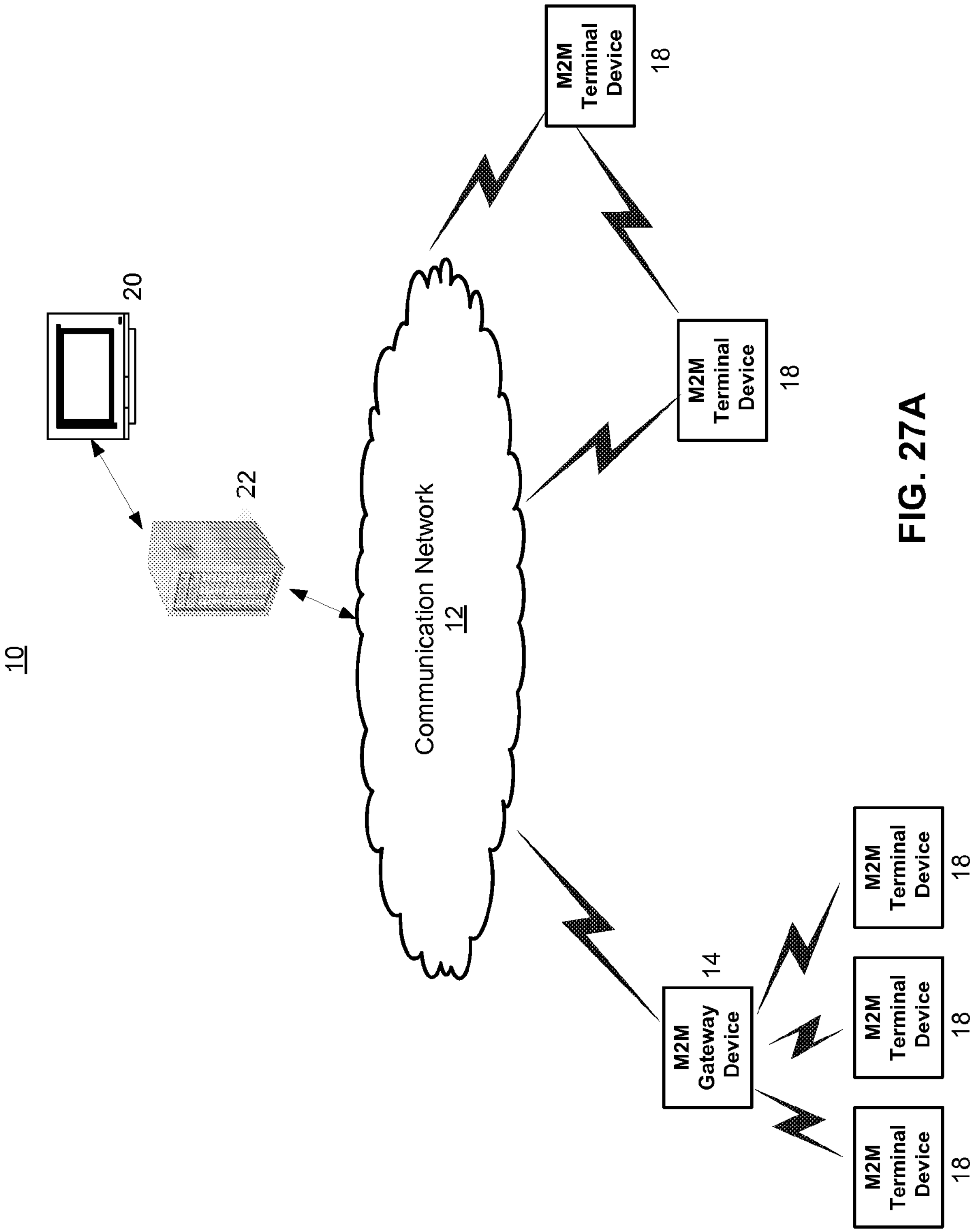
FIG. 27A is a system diagram of an example machine-to-machine (M2M) or Internet of Things (IoT) communication system in which one or more disclosed examples may be implemented.
Figure 27B:
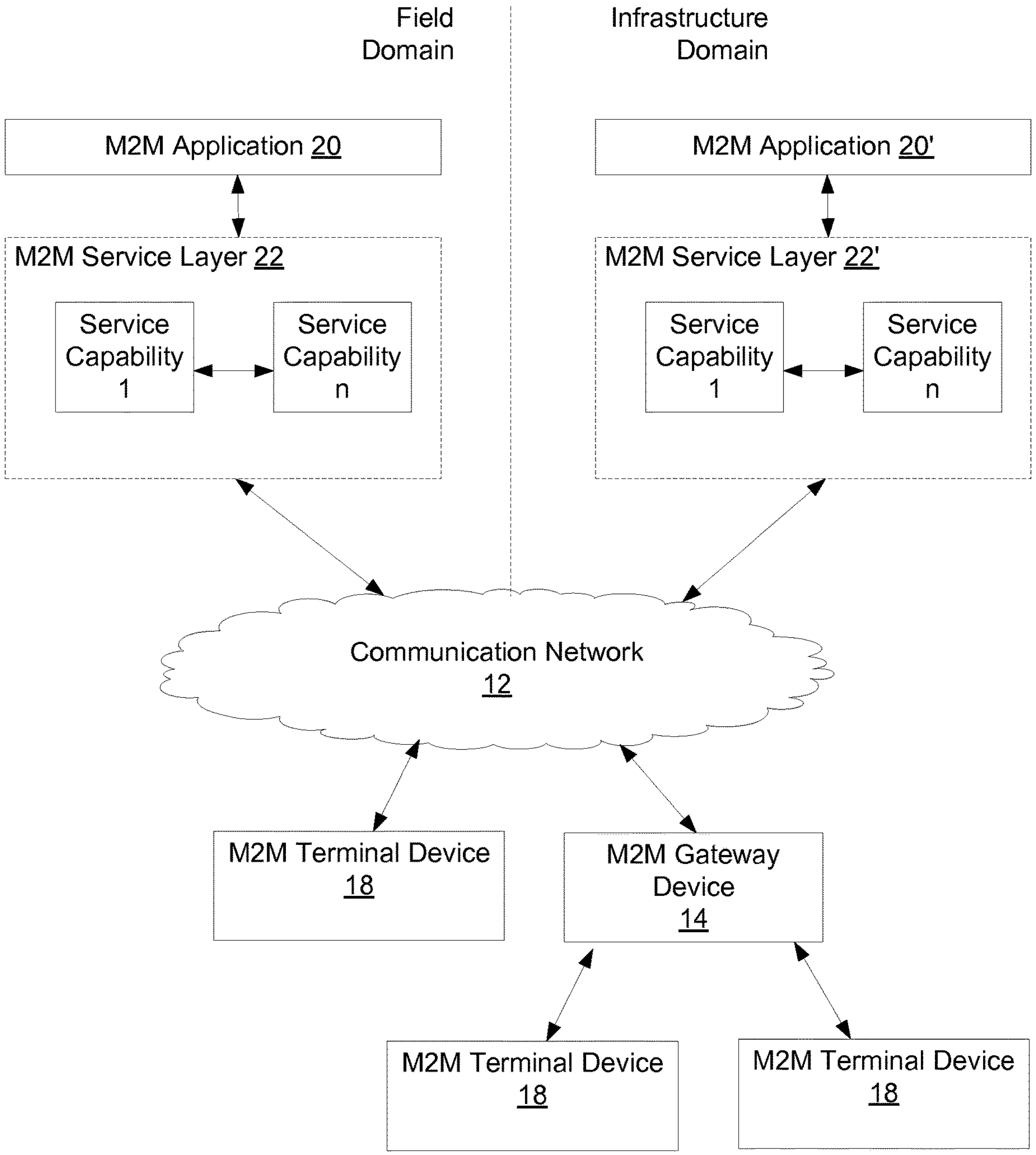
FIG. 27B is a system diagram of an example architecture that may be used within the M2M/IoT communications system illustrated in FIG. 27A.
Figure 27C:
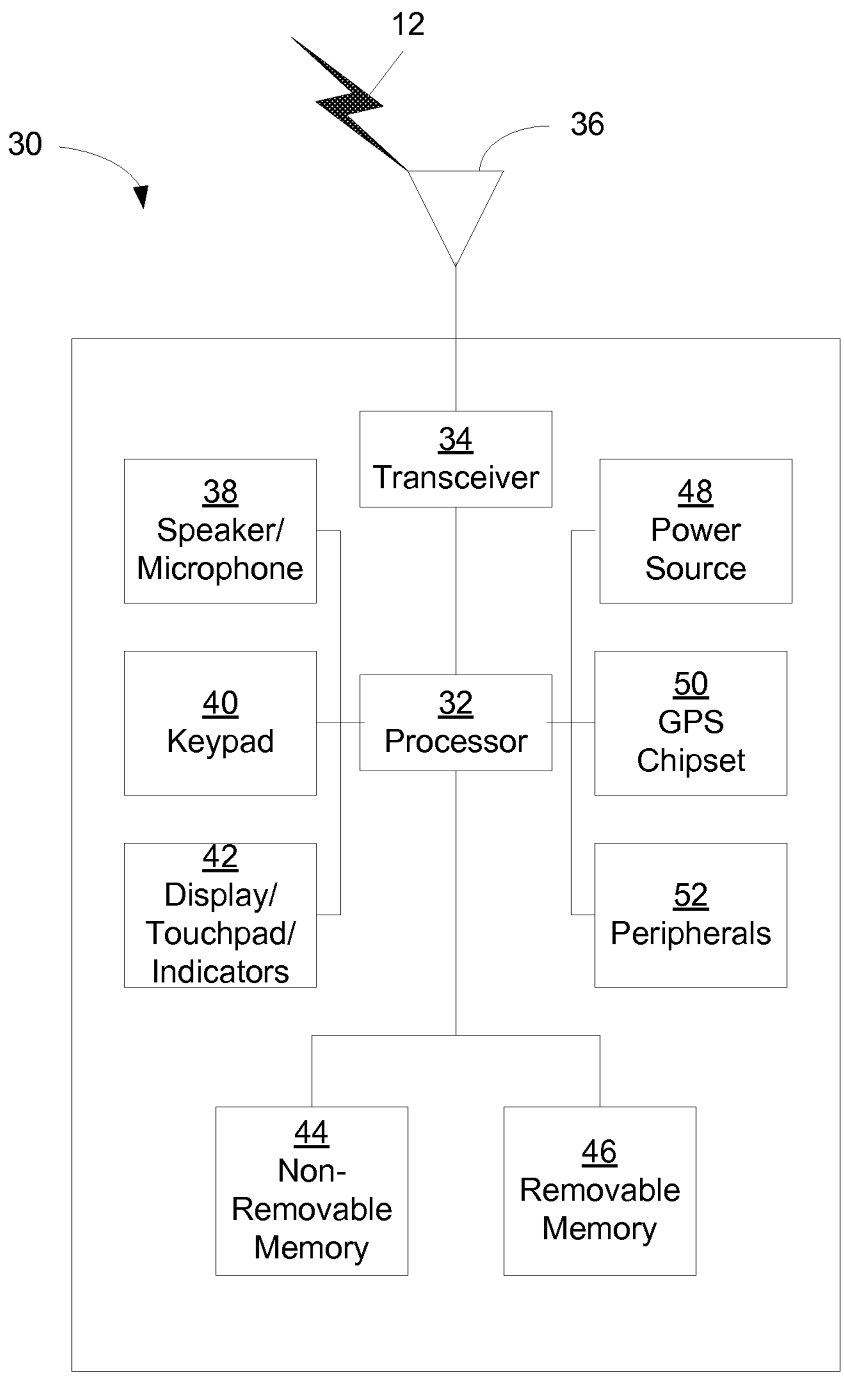
FIG. 27C is a system diagram of an example M2M/IoT terminal or gateway device that may be used within the communications system illustrated in FIG. 27A.
Figure 27D:
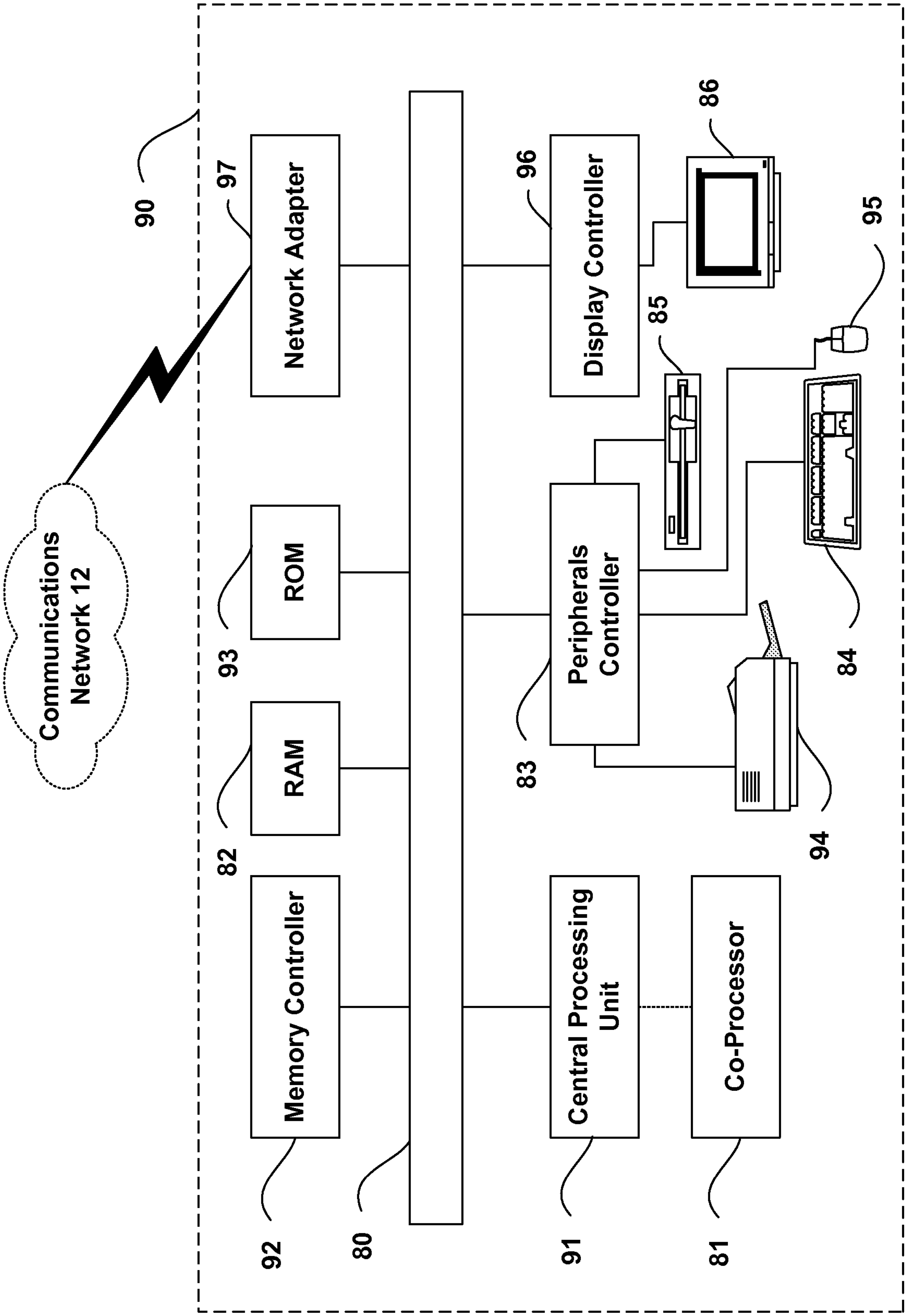
FIG. 27D is a block diagram of an example computing system in which aspects of the communication system of FIG. 27A may be embodied.

It is contemplated herein that the entities performing the steps illustrated in FIG. 6-FIG. 21 and throughout may be logical entities that may be implemented in the form of software (i.e., computer-executable instructions) stored in a memory of, and executing on a processor of, a device, gateway, server, or computer system such as those illustrated in FIG. 27C or FIG. 27D. In other words, the method(s) illustrated in FIG. 6-FIG. 21 and throughout may be implemented in the form of software (i.e., computer-executable instructions) stored in a memory of a computing device, such as the device or computer system illustrated in FIG. 27C or FIG. 27D, which computer executable instructions, when executed by a processor of the computing device, perform any steps illustrated in FIG. 6-FIG. 21 and the like.

Figure 6:
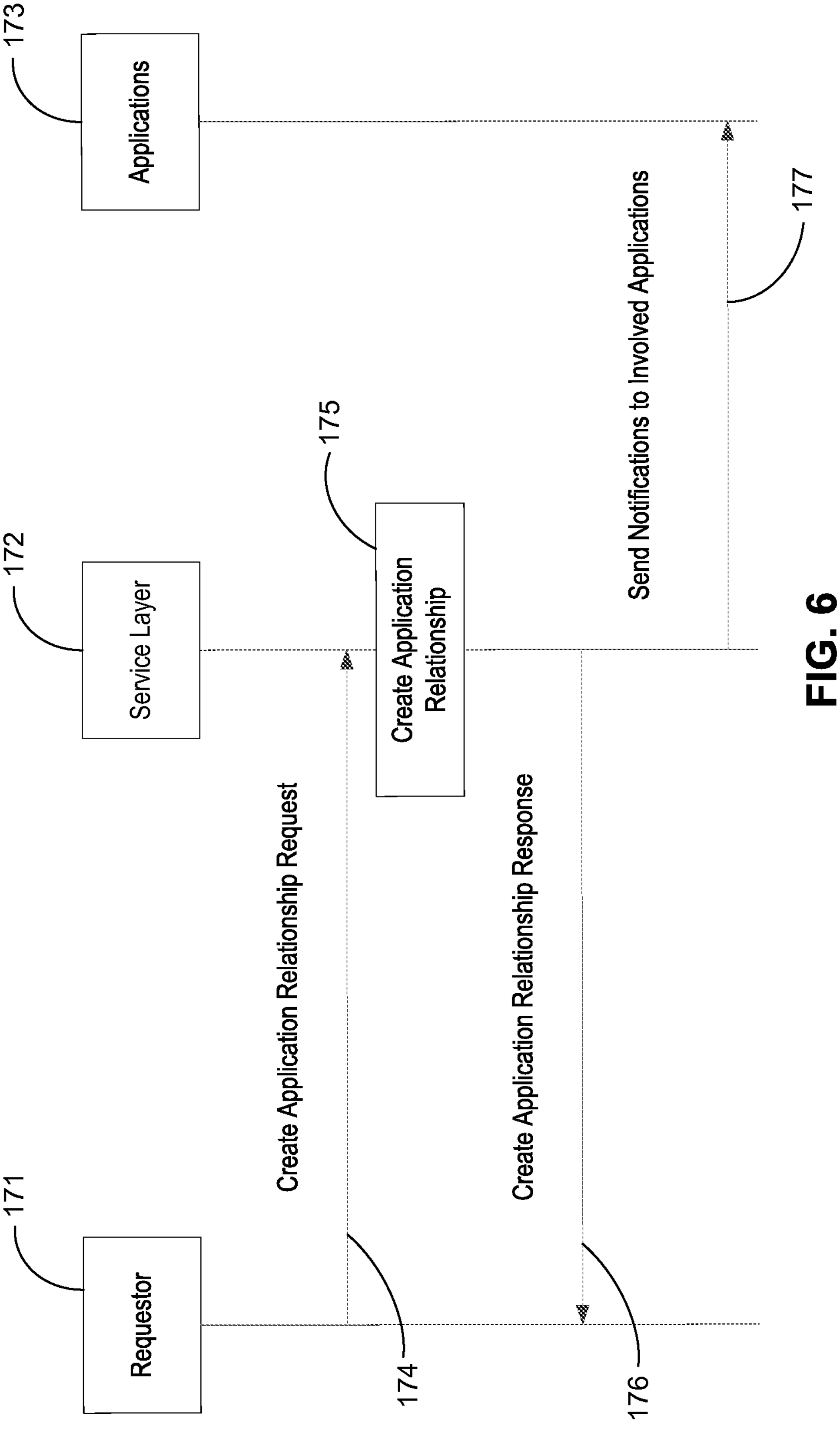
FIG. 6 illustrates an exemplary method for creating an application relationship.

FIG. 6 illustrates an exemplary method for creating application relationships among a set of existing registered applications. At step 174, requestor 171 (e.g., an oneM2M AE or oneM2M CSE) sends a request to create an application relationship (e.g., create an application relationship request) to service layer 172 (e.g., oneM2M CSE with ARM service). The request of step 174 may comprise ARAs with regard to application relationship type, list of applications registered with service layer 172, primary application, or relationship lifetime. At step 175, based on the information received in step 174, the service layer 172 may create a corresponding application relationship resource. The application relationship resource may be an application relationship record as illustrated in Table 1. Alternatively, corresponding ARAs, such as those listed with regard to step 174, may be added to each involved application. At step 176, service layer 172 sends response back to requestor 171. This message may contain the identifier (e.g., its URI) of the created application resource (e.g., application relationship record or ARA). At step 177, service layer 172 sends notifications to the other applications on the list of applications of step 174.

Figure 7:
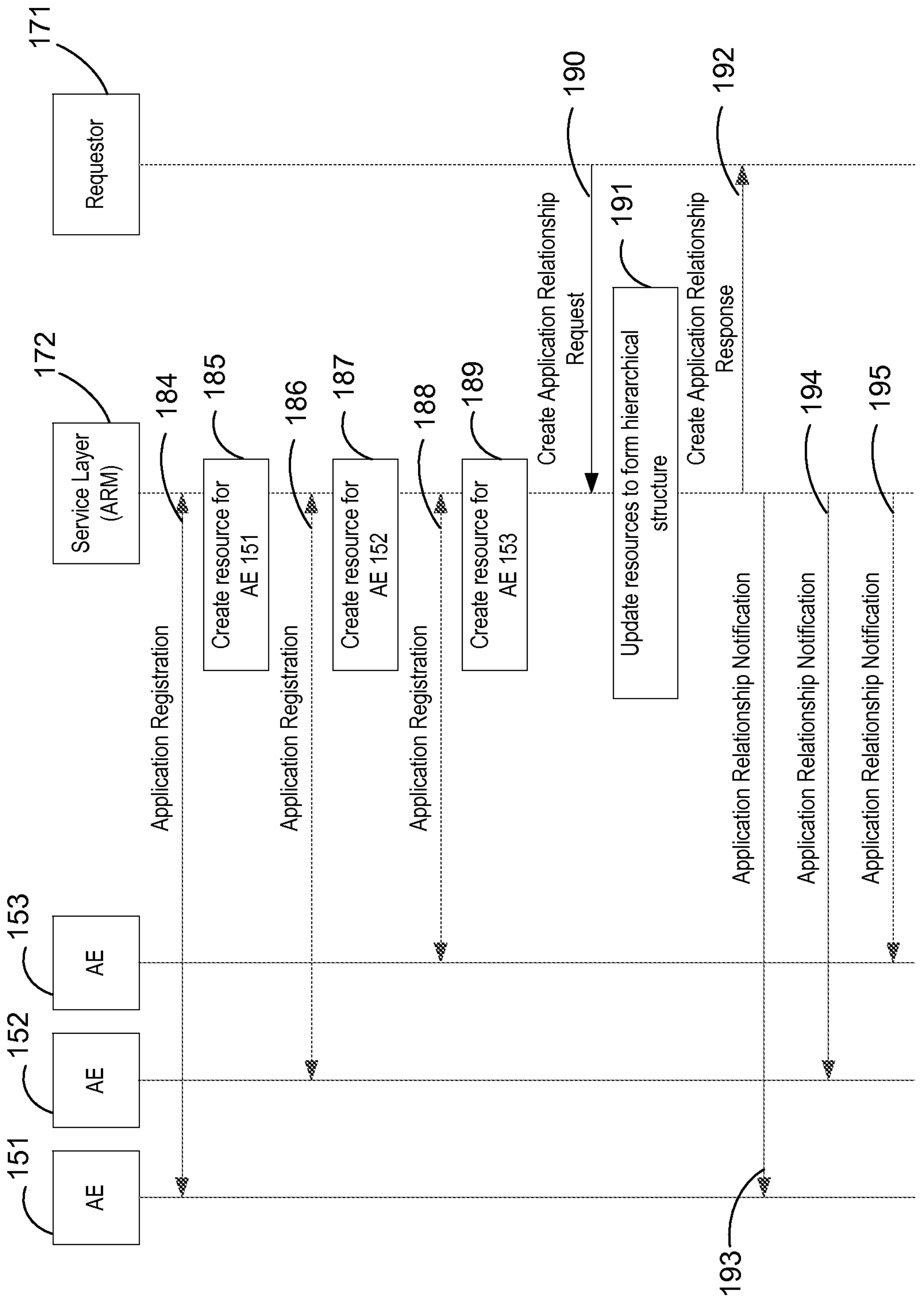
FIG. 7 illustrates an exemplary parent/child application relationship creation.

FIG. 7 illustrates an exemplary method for creating parent/child application relationship. AE 151 is the parent application, while AE 152 and AE 153 are child applications, as similarly illustrated in FIG. 4A. At step 184, AE 151 registers with service layer 172 (e.g. oneM2M CSE-ARM service). At step 185, service layer 172 creates a resource for AE 151. At step 186, AE 152 registers with service layer 172. At step 187, service layer 172 creates a resource for AE 152. At step 188, AE 153 registers with service layer 172. At step 189, service layer 172 creates a resource for AE 153.

Conventional application registration procedures for oneM2M may be leveraged for step 184 through step 189.

At step 190, requestor 171 sends a create application relationship request message to service layer 172 to create or update parent/child relationship of AE 151, AE 152, and AE 153. Requestor 171 could be AE 151, AE 152, AE 153, another application, or another service layer 172 entity (e.g., another CSE). The same service layer 172 may also trigger to establish parent/child relationship among AE 151, AE 152, and AE 153; in this case, step 190 may be skipped. A create application relationship request message may contain the following information: the relationship between AE 151, AE 152, and AE 153; the link to resources for AE 151, AE 152, and AE 153 which are created in Step 185, Step 187, and Step 189 respectively; and the names, labels, or identifiers of AE 151, AE 152, and AE 153. At step 191, service layer 172 may update resources for AE 151, AE 152, and AE 153 to establish parent/child relationship among AE 151, AE 152, and AE 153 applications. AE 151's resource may be added with a child pointer or link that connects to the resources for AE 152 and AE 153. AE 152's (or AE 153's) resource may be added with a parent pointer or link that connects to the resource for AE 151. The child pointer or link will be a new attribute or sub-resource of AE 151's resource and its value is the URI of the resources for AE 152 and AE 153. Likewise, the added parent pointer or link will be a new attribute or sub-resources of AE 152's (or AE 153's) resource and its value is the URI of the resource for AE 151. AE 152's (or AE 153's) resource may be added with a sibling pointer or link that connects to the resource for AE 153 (or AE 152). This sibling pointer or link may be used to indicate that AE 152 and AE 153 are involved in an application relationship and have the same parent application. The sibling pointer or link added to AE 152's resource as a new attribute or sub-resource has the value of URI of AE 153's resource. The sibling pointer or link added to AE 153's resource as a new attribute or sub-resource has the value of URI of AE 152's resource.

At step 192, service layer 172 may send a response back to requester 171 to notify the successful creation of parent/child relationship among AE 151, AE 152, and AE 153. At step 193, service layer 172 sends an application relationship notification to AE 151. The application relationship notification of step 193 may have the following information: the relationship between AE 151, AE 152, and AE 153; the link to resources for AE 152 and AE 153 which are created in step 187 and step 189, respectively; or the names, labels, or identifiers of AE 152 and AE 153. At step 194, service layer 172 may send an application relationship notification to AE 152. The application relationship notification of step 194 may contain the following information: the relationship between AE 151, AE 152, and AE 153; the link to resources for AE 151 and AE 153 which are created in step 185 and step 189 respectively; or the names, labels, or identifiers of AE 151 and AE 153. At step 195, service layer 172 may send application relationship notification to AE 153. This message may contain the following information: the relationship between AE 151, AE 152, and AE 153; the link to resources for AE 151 and AE 152 which are created in step 185 and step 187, respectively; or the names, labels, or identifiers of AE 151 and AE 152.

A similar procedure to what is shown in FIG. 7 may be applied to create a composition/input application relationship among AE 156, AE 154, and AE 155, where AE 156 is the composite application and AE 154 and AE 155 are input applications.

Figure 8:
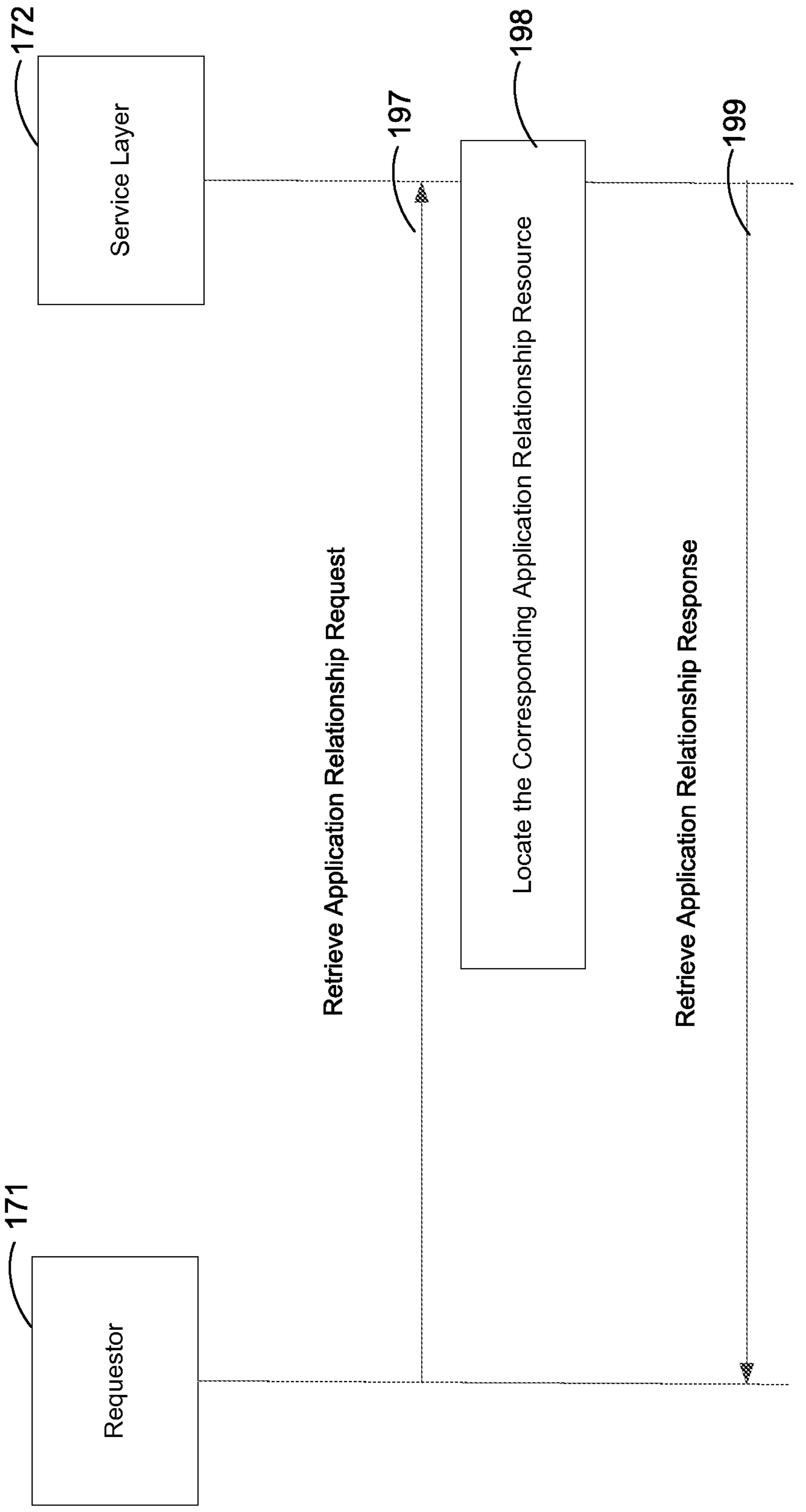
FIG. 8 illustrates an exemplary method for retrieving application relationships among existing registered applications.

Another generic operation may involve retrieving an existing application relationship. For example, an M2M application may access the application relationship record database maintained at a M2M server to retrieve a particular application relationship according to the Approach 1 in FIG. 5A, or access the new attributes/links created for involved applications according to the Approach 2 in FIG. 5B. FIG. 8 illustrates an exemplary method for retrieving application relationships among existing registered applications. At step 197, requestor 171 (e.g., oneM2M AE, oneM2M CSE) may send a request to retrieve on or more relationships of an application (e.g., retrieve application relationship request) to service layer 172 (e.g., oneM2M CSE with ARM service). The retrieve application relationship request may include the address of application relationship resource, such as ARRI (e.g., the identifier of the application relationship record to be retrieved), or include the address of ARA, as defined herein. At step 198, based on the information received in step 197, the service layer 172 locates the corresponding application relationship record, such as the information shown in Table 1. At step 199, service layer 172 may send a response back to requestor 171. The response of step 199 may include the representation of the desired application relationship record or ARA.

Figure 9:
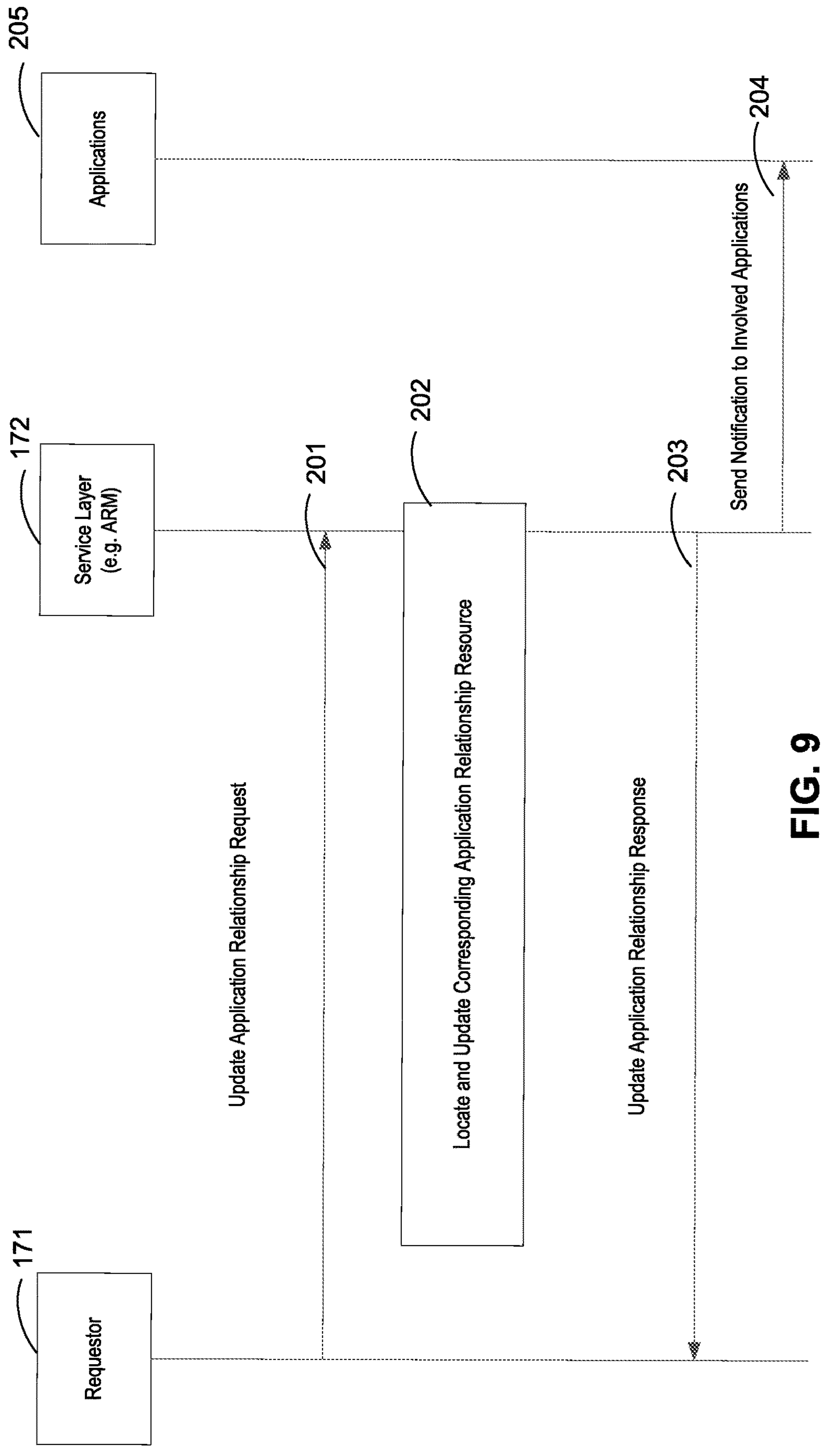
FIG. 9 illustrates an exemplary method for updating application relationships among existing registered applications.

Another generic operation may involve updating an existing application relationship. For example, an M2M application may update the application relationship record database maintained at the M2M server to update an existing application relationship (e.g., to change the child application or input application) according to the approach of FIG. 5A, or update the new attributes/links created for involved applications according to the approach of FIG. 5B. FIG. 9 illustrates an exemplary method for updating application relationships among existing registered applications. At step 201, requestor 171 may send a request to update application relationship (e.g., update application relationship request) to service layer 172. The update application relationship request may include the following information: ARRI (e.g., the identifier of the application relationship record to be updated), other attributes to be updated for the desired application relationship record such as the list of applications, or address or values of ARA as discussed herein. At step 202, based on the information received in step 201, the service layer 172 may locate and update the corresponding Application Relationship Record or ARA as requested in step 201. At step 203, service layer 172 may send a response back to requestor 171. The response of step 203 may include the representation of the updated application relationship record or ARA. At step 204, service layer 172 may send a notification to involved applications 205 on the updated list of applications about the change of application relationship record or ARA.

Figure 10:
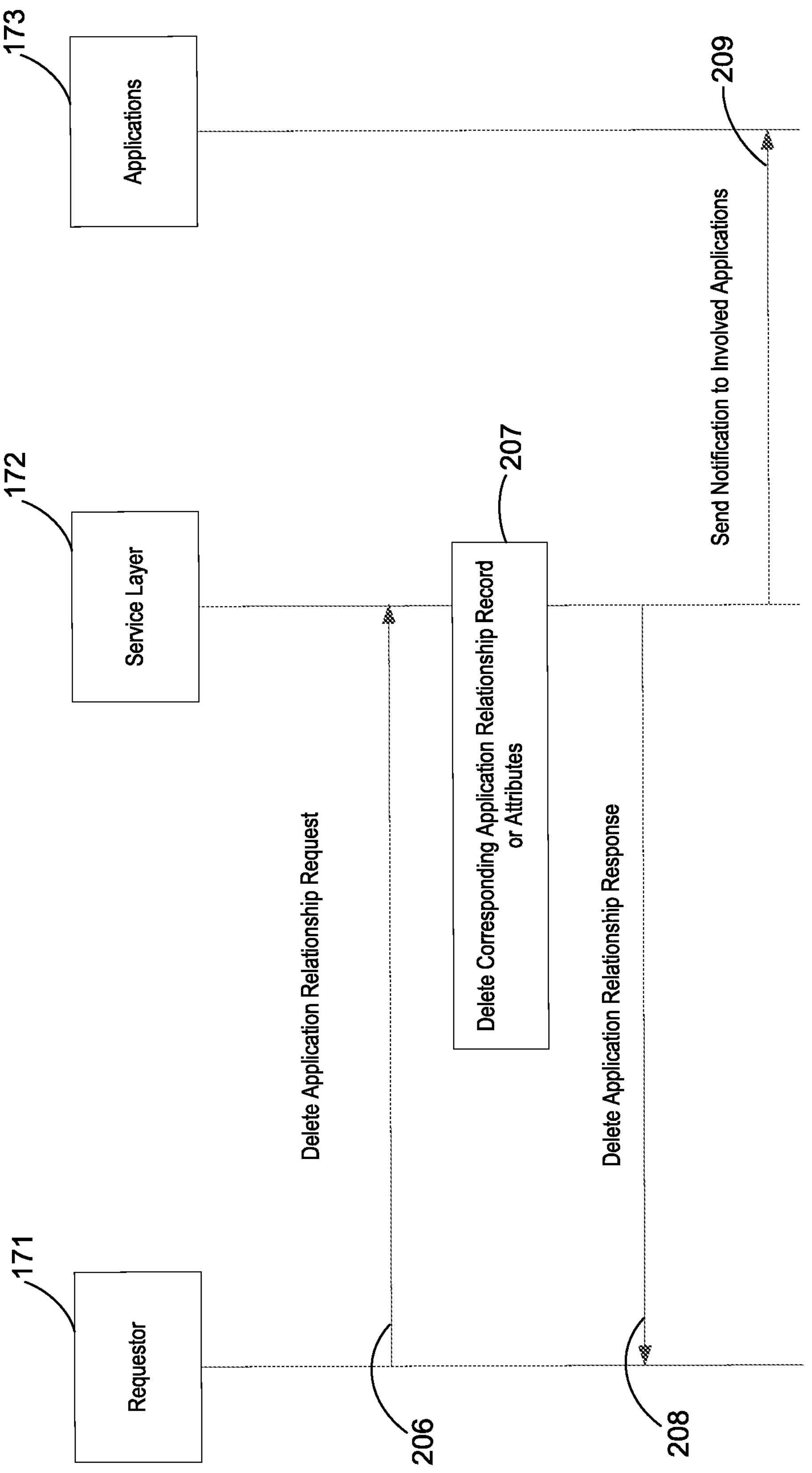
FIG. 10 illustrates an exemplary method for deleting application relationships among existing registered applications.

A generic operation may involve deleting an existing application relationship. For example, an M2M application can delete its existing application relationship from the application relationship record database as maintained at the M2M server according to the approach of FIG. 5A, or delete the new attributes/links created for involved applications according to the approach of FIG. 5B. FIG. 10 illustrates an exemplary method for deleting application relationships among existing registered applications. At step 206, requestor 171 sends a request to delete an application relationship (e.g., delete application relationship request) to service layer 172. This delete application relationship request may include an ARRI (e.g., the identifier of the application relationship record to be deleted) or the address of application relationship attributes. At step 206, requestor 171 may choose not to explicitly indicate the ARRI, but give certain criteria on application relationship records to be deleted. For example, to delete application relationship records where one or more specific applications (e.g., AE 151) are involved. At step 207, based on the information received in step 206, service layer 172 locates and deletes the corresponding application relationship record or ARA. At step 208, the service layer 172 sends response back to Requestor 171. This response of step 208 may contain the deletion result (e.g., success or failure). At step 209, service layer 172 may send a notification to all involved applications (e.g., applications 173) on the list of applications (e.g., parent/child or composition/input applications).

Figure 11:
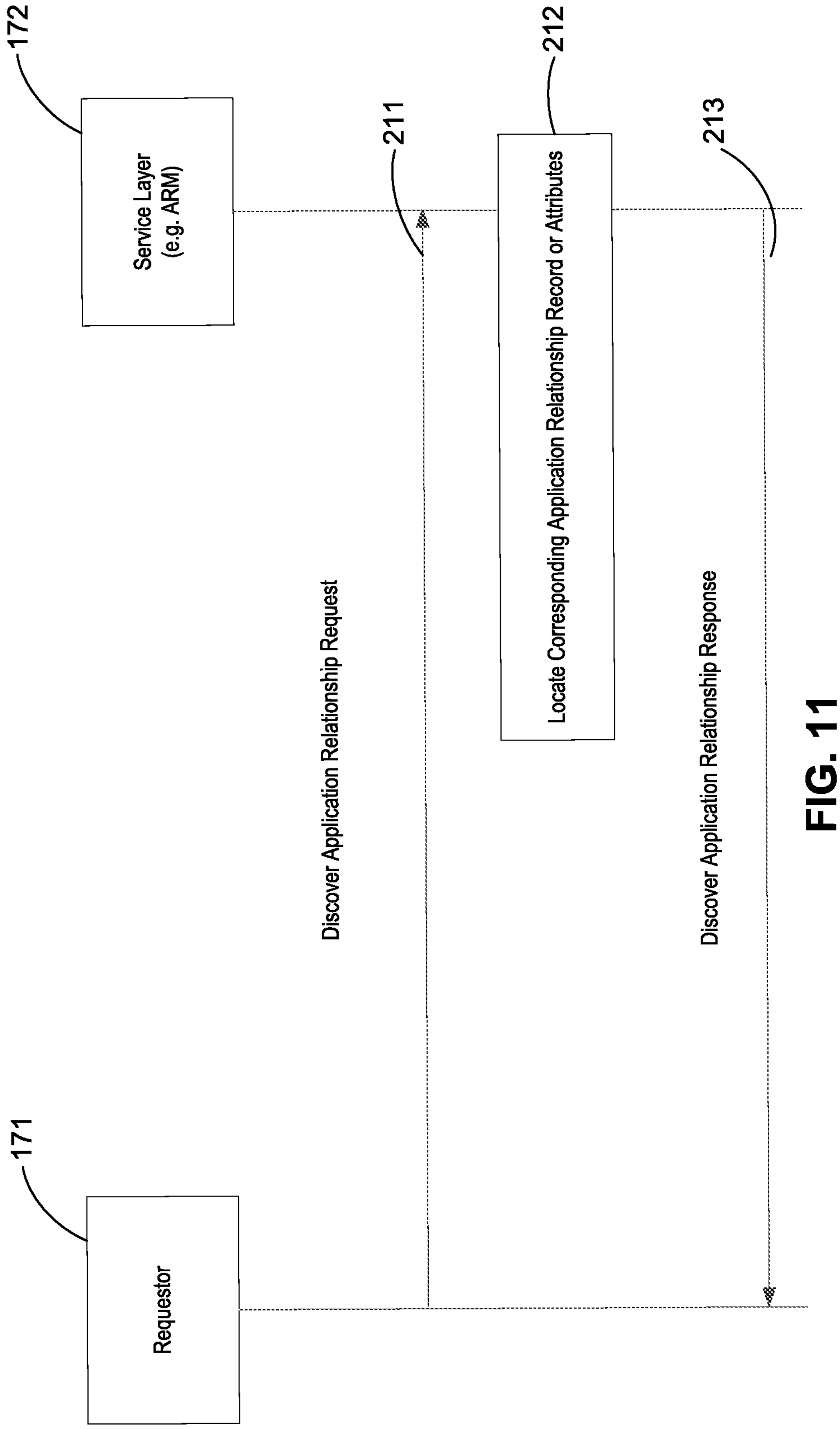
FIG. 11 illustrates an exemplary method for discovering application relationships among existing registered applications.

A generic operation may involve discovering existing application relationships. For example, an M2M application can access the application relationship record database maintained at the M2M server to discover application relationships it has with other applications according to the approach of FIG. 5A, or access the new attributes/links created for involved applications according to the approach of FIG. 5B to discover corresponding application relationships. FIG. 11 illustrates an exemplary method for discovering application relationships among existing registered applications. At step 211, requestor 171 sends a request to discover application relationships (e.g., discover application relationship request) to service layer 172. This discover application relationship request may include certain search criteria, such as discover application relationships associated with a particular application name/identifier, discover application relationships among a set of particular applications, discover a particular type of application relationships, or discover application relationships, which have a particular number of applications involved. At step 212, based on the information received in step 211, service layer 172 locates the corresponding application relationship record or application relationship attribute. At step 213, service layer 172 sends response back to requestor 171. The response of step 213 may contain the list of discovered application relationship records or ARAs (e.g., their identifiers or addresses).

Discussed below are a few new value-added (enhanced) services that may use application relationships (e.g., parent/child relationship and composition/input relationship), such as enhanced application registration service, enhanced application announcement service, enhanced application software management service, relationship-aware application discovery, or subscription and notification of application relationships. Enhanced application registration may include enhanced registration procedures and de-registration procedures, which may apply to parent/child applications, composition/input applications, and other relationships. During the enhanced registration process, application relationship record or ARA may be automatically created. During the enhanced de-registration process, application relationship record or ARA may be automatically updated or removed. In an example, the parent application and child applications may be co-located in the same M2M device, gateway, or server, such as those in the gym use case. Before performing registration, applications may first bootstrap and establish individual secure connections between themselves and a service layer. In this bootstrap process, the parent application may help child applications to establish their secure connections with the service layer during its own security bootstrap process.

Figure 12:
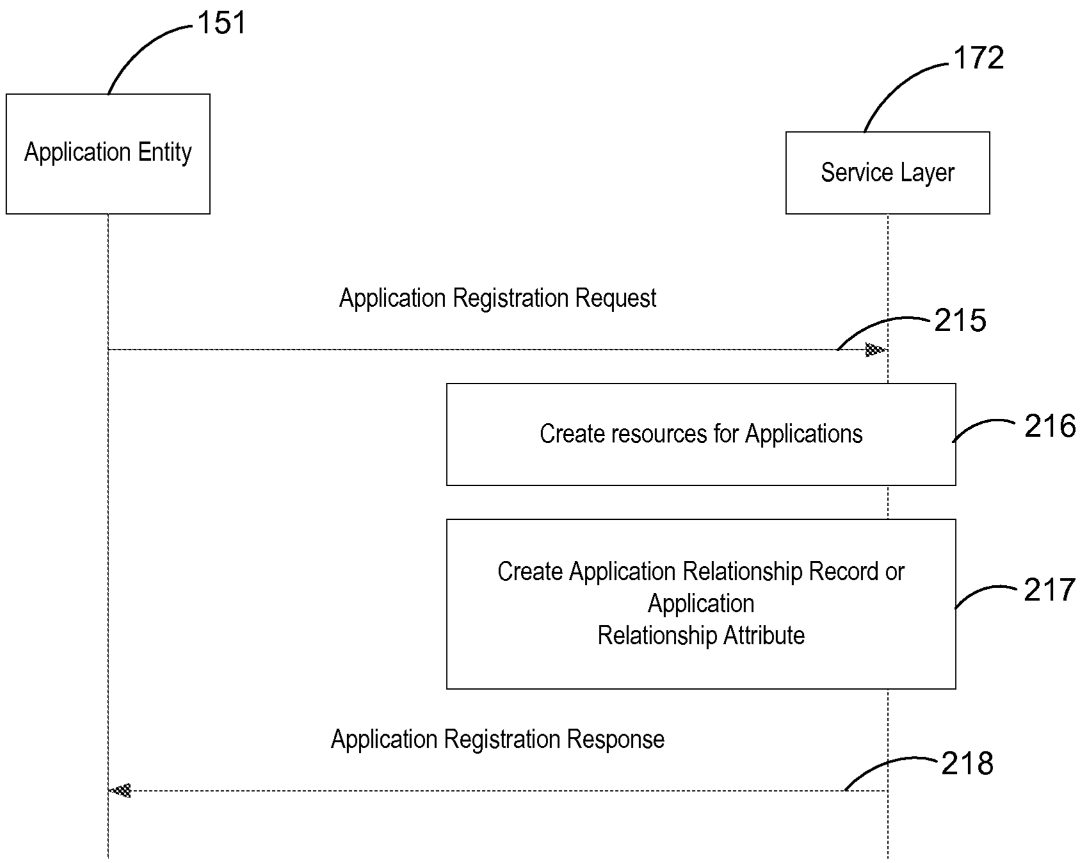
FIG. 12 illustrates an exemplary parent/child application registration process.

FIG. 12 illustrates an exemplary method for parent/child application registration process. AE 151 is the parent application, while AE 152 and AE 153 are child applications. At step 215, AE 151 sends a request to register an application (e.g., an application registration request) to service layer 172. This application registration request may include information such as: the relationship between AE 151, AE 152, and AE 153; the description of AE 151, AE 152, or AE 153; or the names, labels, or identifiers of AE 151, AE 152, or AE 153. At step 216, service layer 172 creates corresponding resource for AE 151, AE 152, or AE 153. At step 217, service layer 172 may create a corresponding application relationship record or ARA. The created ARA may be used to create attributes for each created application resource. For example, a created resource for AE 151 may have a child pointer or link that connects to the resources for AE 152 and AE 153. In another example, a created resource for AE 151 (or AE 153) may have a parent pointer or link that connects to the resource for AE 152. In another example, a created resource for AE 152 (or AE 153) may have a sibling pointer or link which connects to the resource for AE 153 (or AE 152). At step 218, service layer 172 sends response back to AE 151 that may include the link of resources created for AE 151, AE 152, or AE 153.

Figure 13:
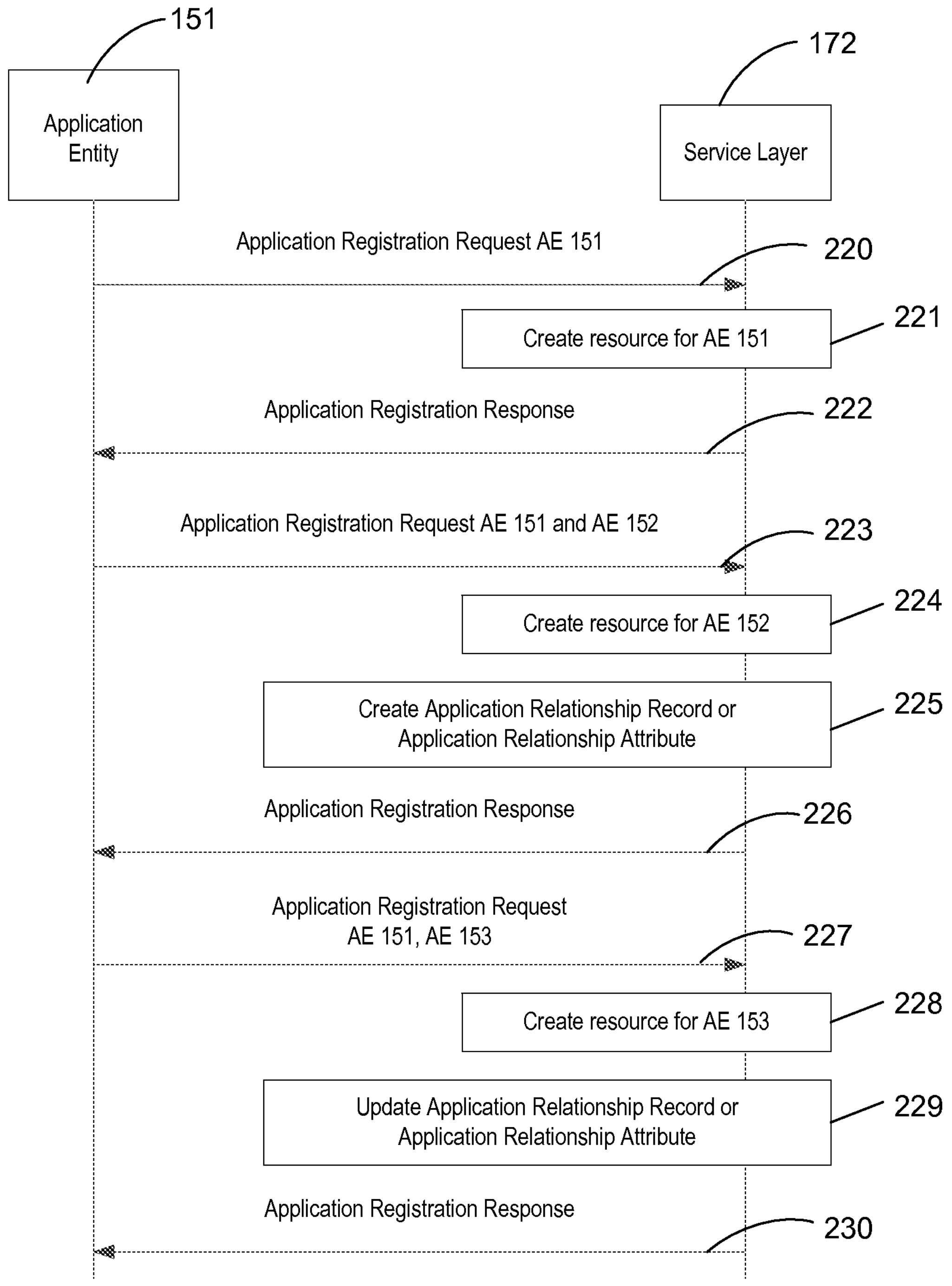
FIG. 13 illustrates an exemplary parent/child application registration process.

FIG. 13 illustrates another exemplary method for parent/child application registration. AE 151 may be the parent application, while AE 152 and AE 153 are child applications. At step 220, AE 151 may send an application registration request to service layer 172 to register AE 151 only. At step 221, service layer 172 may create a corresponding resource for AE 151. At step 222, service layer 172 sends a response back to AE 151. The response at step 22 may include a result of creating the resource for AE 151, e.g. success or fail, as well as the content of the created resource. At step 223, AE 151, may send another application registration request to service layer 172 to register AE 151. The application registration request of step 223 may include information such as the link to the resource for AE 151 created in step 221, the relationship between AE 151 and AE 152, the description of AE 152, or the names, labels, or identifiers of AE 151 and AE 152. At step 224, service layer 172 creates corresponding resource for AE 152. At step 225, service layer 172 creates a corresponding application relationship record or ARA. The created ARA may be used to create new attributes for each created application resources. The created resource for AE 152 may have a parent pointer or link that connects to the resource for AE 151. Service layer 172 may update the resource of AE 151 to add a child pointer or link that connects to the resources for AE 152.

At step 226, service layer 172 may send a response to AE 151. This response of step 226 may include the link of resources created for AE 152. At step 227, AE 151 may send another application registration request to service layer 172 to register AE 153. This application registration request of step 227 may include information, such as: the link to the resource for AE 151 created in step 221; the relationship between AE 151 and AE 153; the description of AE 153; or the names, labels, or identifiers of AE 151 and AE 153. At step 228, service layer 172 creates corresponding resources for AE 153. At step 229, service layer 172 updates application relationship record or ARAs as created in step 191. The ARA may be used to attributes for each created application resources. The created resource for AE 153 may have a parent pointer or link which connects to the resource for AE 151. Service layer 172 may update resource for AE 151 to add a child pointer or link which connects to the resources for AE 153. At step 230, service layer 172 may send a response back to AE 151. The response of step 230 may include a link of resources created for AE 153.

Figure 14:
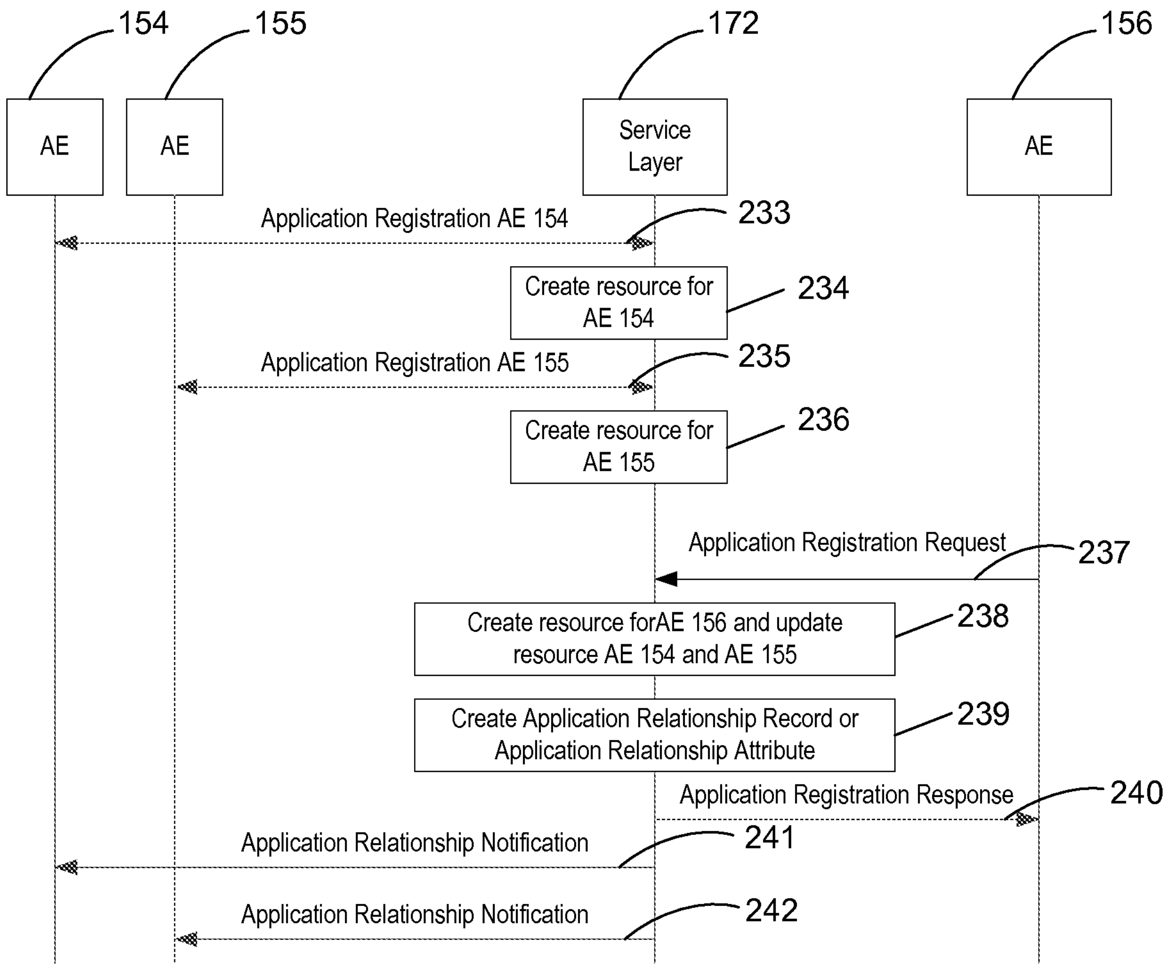
FIG. 14 illustrates an exemplary method for composition/input application registration.

FIG. 14 illustrates an exemplary method for composite application registration. AE 156 is the composite application, while AE 154 and AE 155 are input applications. Also this registration process may not be the first-time registration for AE 155 and in turn AE 156 may have knowledge about AE 154 and AE 155. In steps 233 thru step 236, AE 154 and AE 155 independently register themselves to service layer 172. At step 233, service layer 172 (e.g., ARM) may exchange registration messages for AE 154. At step 234, service layer 172 may create a resource for AE 154. At step 235, service layer 172 may exchange registration messages for AE 155. At step 236, service layer 172 may create a resource for AE 155. At step 237, AE 156 may send an application registration request to the service layer 172 to register itself (AE 156) and in the meantime to inform service layer 172 that AE 156 is a composite application with AE 154 and AE 155 as two input applications. The application registration request of step 237 may include information, such as the relationship between AE 156, AE 154, and AE 155, the description of AE 156, AE 154, and AE 155, the names, labels, or identifiers of AE 156, AE 154, and AE 155; or the link to resources of AE 154 or AE 155, which are created in step 234 and step 236, respectively. One way for AE 156 to obtain this information is to use discovery function (e.g., Discovery CSF in oneM2M).

At step 238, service layer 172 may create a resource for AE 151 and update resources for AE 154 and AE 155. At step 239, service layer 172 may create corresponding application relationship record or ARA. The created ARA may have attributes for each created application resource, such as: a resource for AE 156 which includes input pointers or links that connect to resources for AE 154 and AE 155; a resource for AE 154 which includes a composite link that connects to resources for AE 156; or a resource for AE 155 which includes a composite link that connects to resources for AE 156. At step 240, service layer 172 may send an application registration response to AE 156. At step 241, service layer 172 may send an application relationship notification to AE 154. This application relationship notification may include information, such as the relationship between AE 156 and AE 154, the link to resources for AE 156, or the names, labels, or identifiers of AE 156. At step 242, service layer 172 may send an application relationship notification to AE 155. This application relationship notification may include information, such as the relationship between AE 156 and AE 155, the link to resources for AE 156, the names, labels, or identifiers of AE 156.

Figure 15:
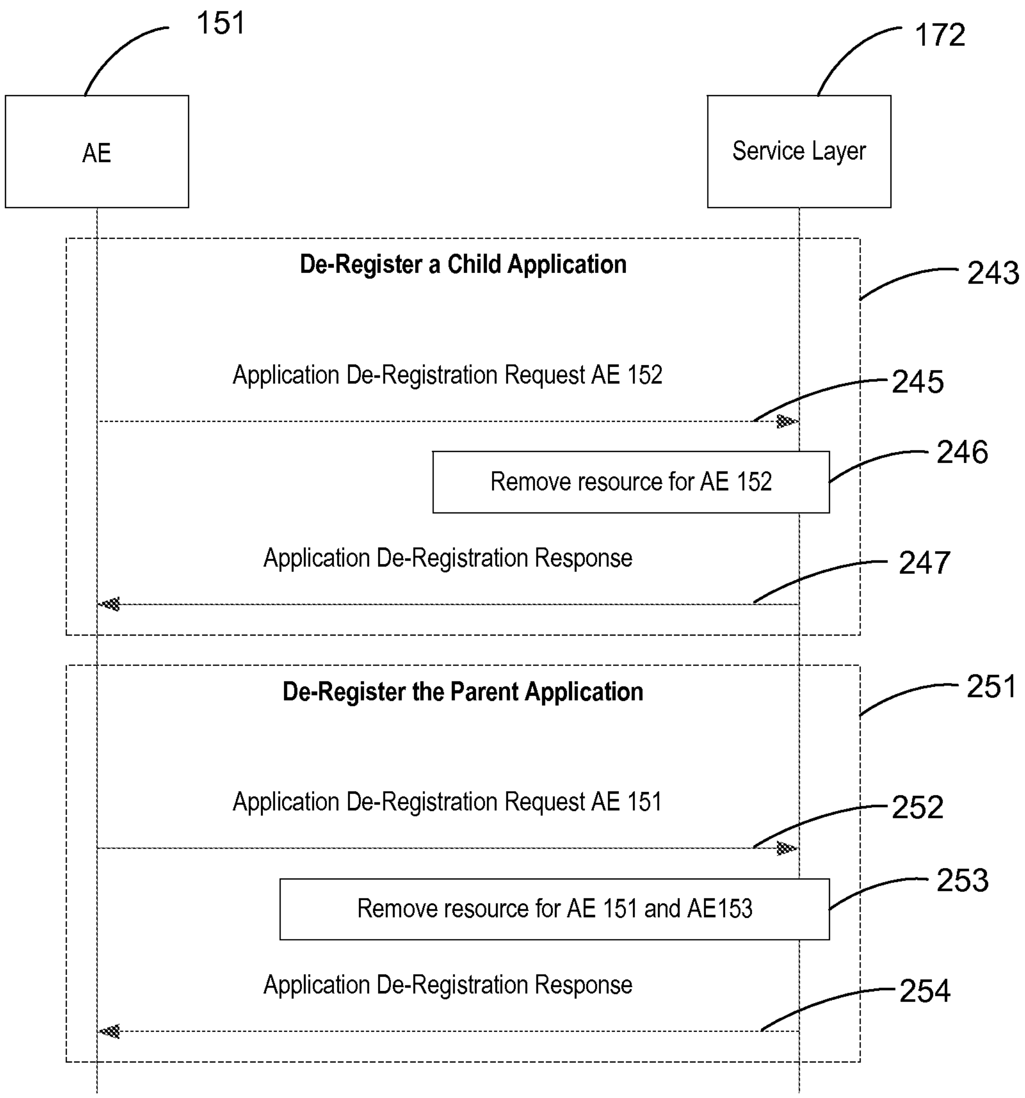
FIG. 15 illustrates an exemplary method for parent/child application de-registration.

FIG. 15 shows exemplary procedures for parent/child application de-registration. Here, AE 151 is the parent application, while AE 152 and AE 153 are child applications. Block 243 involves de-registering a child application, while block 251 involves de-registering a parent application. At step 245, AE 151 sends a request to de-register an application from the service layer (e.g., an application de-registration request) to service layer 172 to de-register one of the child applications (e.g., AE 152). This application de-registration request of step 245 may include information, such as: the name, label, or identifier of the child application to be de-registered; or the link to the resource of the child application to be de-registered. At step 246, service layer 172 removes the resource of the child application to be de-registered (e.g., the resource of AE 152). Service layer 172 may also remove from the resource of AE 151, the child pointer or link which connects to AE 152. Service layer 172 may also remove from the resource of AE 153, the sibling pointer or link which connects to AE 152. In addition, service layer 172 may also update a corresponding application relationship record. At step 247, service layer 172 may send a response back to AE 151.

With regard to de-registering a parent application in block 251 of FIG. 15, at step 252, AE 151 sends an application de-registration request to service layer 172 to de-register itself (AE 151). At step 253, since AE 153 is the child application of AE 151, service layer 172 may remove the resources for AE 151 and AE 153. Service layer 172 may also remove the corresponding application relationship record. At step 254, service layer 172 may send a response to AE 151. An alternative to the steps shown in block 243 or block 251, a child application may de-register itself and then notify its parent application.

Figure 16:
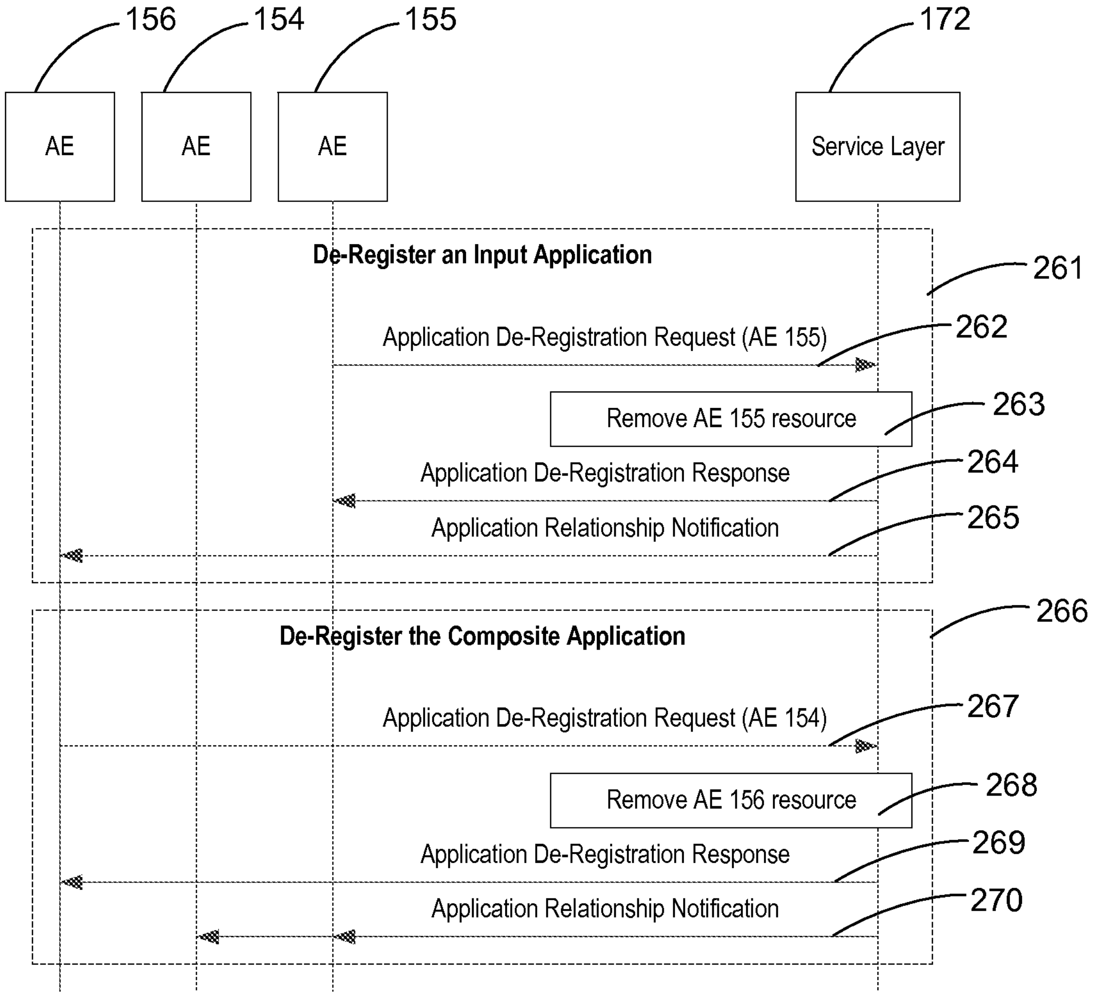
FIG. 16 illustrates an exemplary method for composition/input application de-registration.

FIG. 16 illustrates an exemplary method for composite application de-registration. Here, AE 156 is the composite application, while AE 154 and AE 155 are input applications. Block 261 involves de-registering an input application, while block 266 involves de-registering a composite application. At step 262, AE 155 may send an application de-registration request to service layer 172 to de-register itself. This application de-registration request may include information, such as: the name, label, or identifier of the input application to be de-registered; or the link to the resource of the input application to be de-registered. At step 263, service layer 172 may remove the resource of the input application to be de-registered (e.g., the resource of AE 155). Service layer 172 may also remove from the resource of AE 156 the input pointer or link which connects to AE 155. Service layer 172 may also update the corresponding application relationship record. At step 264, service layer 172 may send a response back to AE 155. At step 265, service layer 172 may send application relationship notification to AE 156. This application relationship notification may contain information such as the name, label, or identifier of the de-registered input application (e.g., AE 155); or the link to the resource of the de-registered input application (e.g., the resource of AE 155).

With regard to block 266 of FIG. 16, at step 267, AE 156 may send request for an application to de-register (e.g., an application de-registration request) to service layer 172 de-register itself (AE 156). At step 268, service layer 172 may remove the resource of AE 156. Service layer 172 may also remove from the resource of AE 154 the composite pointer or link that connects to AE 156. In addition, service layer 172 may remove a corresponding application relationship record. At step 269, service layer 172 sends a response to AE 156. At step 270, service layer 172 may send an application relationship notification to AE 154. This application relationship notification may contain information such as: the name, label, or identifier of the de-registered composite application (e.g., AE 156); the link to the resource of the de-registered composite application (e.g., the resource of AE 156). In another example with regard to FIG. 16, service layer 172 may automatically de-register the composite application AE 156 after step 264 (e.g., after an input application is de-registered, or after a certain number of input applications are de-registered.)

Figure 17:
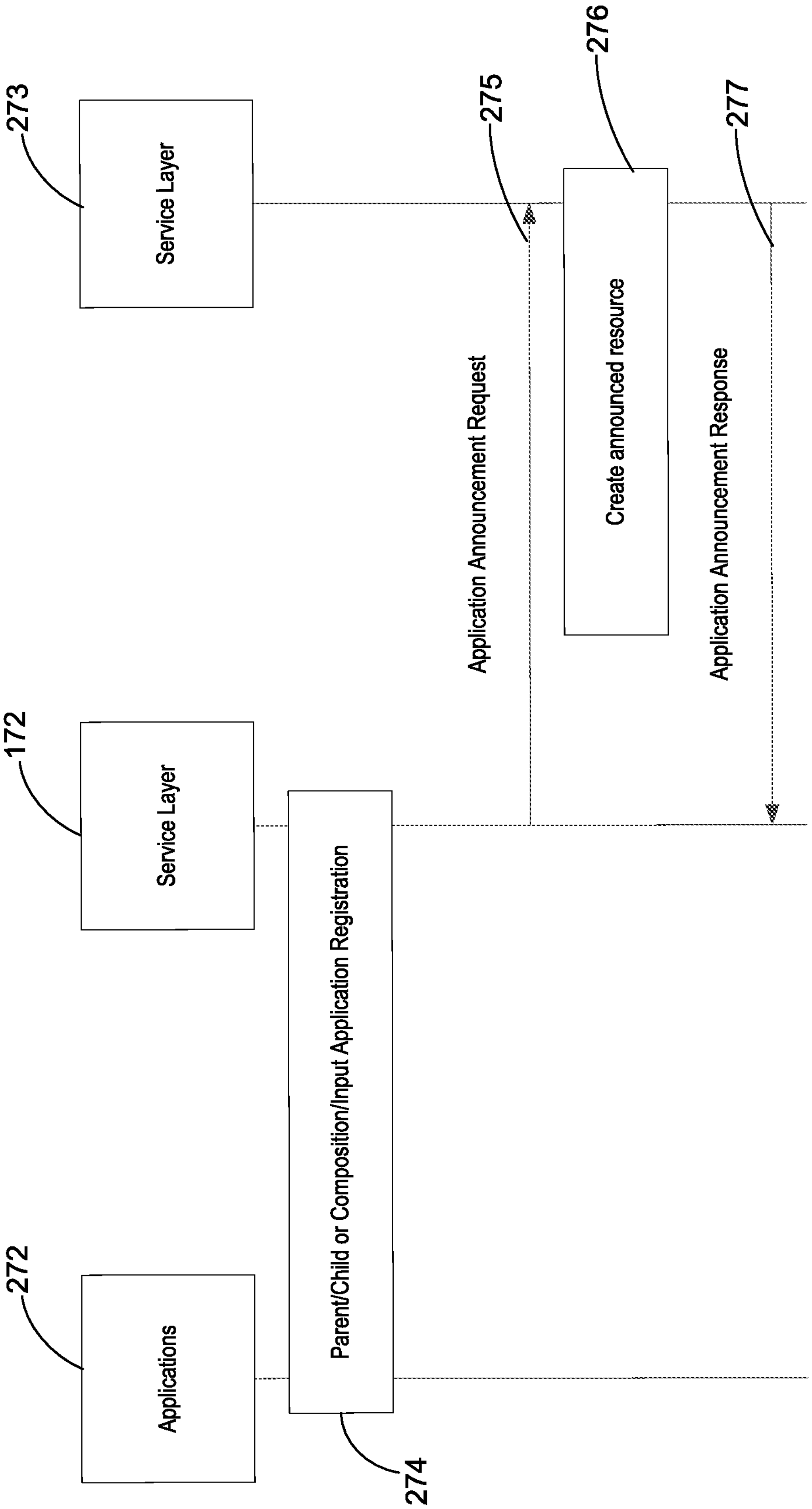
FIG. 17 illustrates an exemplary method for parent/child application announcement.

An enhanced application announcement may refer to the procedure for announcing parent/child applications or composition/input applications. FIG. 17 illustrates an exemplary procedure for parent/child application announcement. It is assumed here that applications block 272 represents applications with a parent/child relationship (e.g., FIG. 4A), a composition/input relationship (e.g., FIG. 4B), or the like. At step 274, the applications of applications block 272 may register themselves to service layer 172, which may be completed with the procedures discussed herein. At step 275, service layer 172 may send an application announcement request to service layer 273. This application announcement request of step 275 may include information such as the relationship of the applications of application block 272, the names, labels, or identifiers of the applications of application block 272, or the link to the resources of the applications of application block 272. At step 276, service layer 273 may create an announced resource for the applications of block 272. The created announced resource may be one hierarchical resource with the relationship of the applications of block 272 embedded. In another example, the created announced resource may be separate, but cross-referred resources, respectively, for each application for the applications of block 272. At step 277, service layer 273 sends response to the service layer 172.

Figure 18:
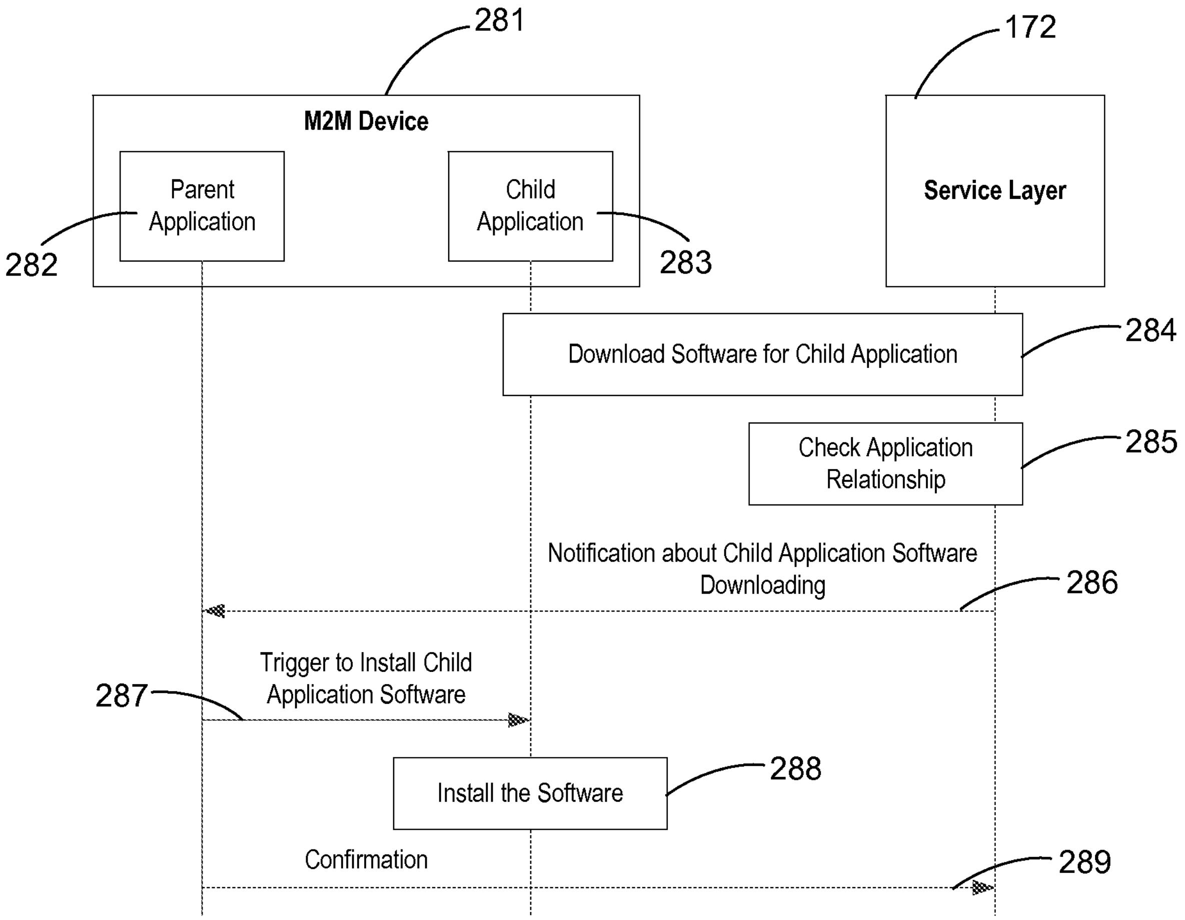
FIG. 18 illustrates an exemplary method for relationship-aware parent/child application software management.

A service layer may manage application software (e.g., upgrade) based on device management (DM) technologies, such as open mobile alliance (OMA) Software Component Management Objects (SCOMO). The following may leverage application relationships to enhance application software management. FIG. 18 illustrates an exemplary method for software management that is relationship aware, such as for a parent/child application. At step 284, service layer 172 retrieves software for child application 283 located on M2M device 281. The software may be located on the same apparatus as service layer 172 or on another apparatus (e.g., server), not shown. Here child application 283 downloads the software with the assistance of service layer 172. At step 285, service layer 172 may analyze the application relationship record or the ARA to discover the corresponding parent application (e.g., parent application 282). At step 286, after service layer 172 assists in the retrieval of software for child applications (the software is not installed yet for child application 283), service layer 172 may send a notification to parent application 282 of M2M device 281. The notification may include the following information: 1) the name, label, or identifier of the child application with downloaded new software; or 2) the new software version. At step 287, parent application 282 may trigger child application 283 to install the new software. This trigger of step 287 may contain the software version to be installed. In this example, parent application 282 may decide to give permission to allow installation of the downloaded software to child application 283. The decision to give permission may be based on determining whether there may be negative effects or other issues if the downloaded software is installed. The effect of the install may be directly to parent application 282, child application 283, or to other associated child applications (not shown) of parent application 282. At step 288, child application 283 may install the corresponding application. At step 289, parent application 282 may send a confirmation message to service layer 172. The message at step 289 may contain an indication of the latest software version of child application 283 or indication that the software of step 284 was installed.

Figure 19:
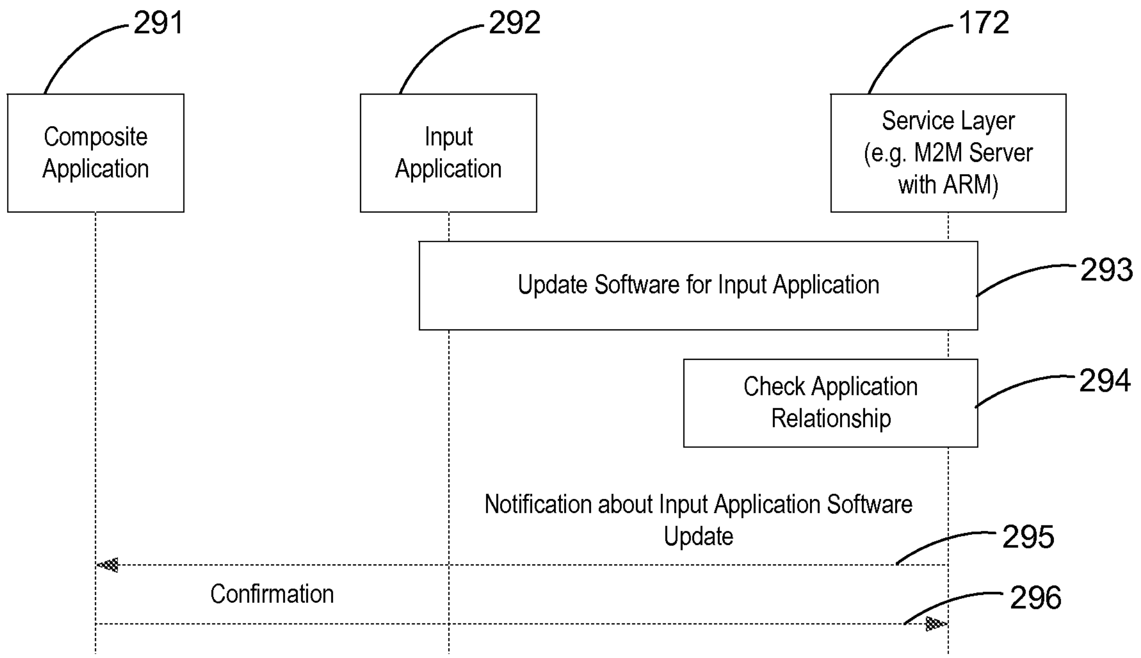
FIG. 19 illustrates an exemplary method for relationship-aware composition/input application software management.

FIG. 19 illustrates an exemplary method for relationship-aware composition/input application software management. At step 293, service layer 172 may update software of input application 292. At step 294, service layer 172 may analyze application relationship record or ARA to discover the corresponding composite application. At step 295, service layer 172 may send a notification to composite application 291 to inform with the name, label, or identifier of input application 292 with updated new software; or the new software version. Composite application 291 may make changes to how it receives input or adjust other operations based on the notification of the new version and any other details received at step 295. Changes may include updating the software of the composite application 291. At step 296, composite application 291 may send a confirmation message to service layer 172 acknowledging notification and may contain other details with regard to composite application 291. The details may include a notification to end the relationship with input application 292, which may be due to incompatibility of the software.

Figure 20:
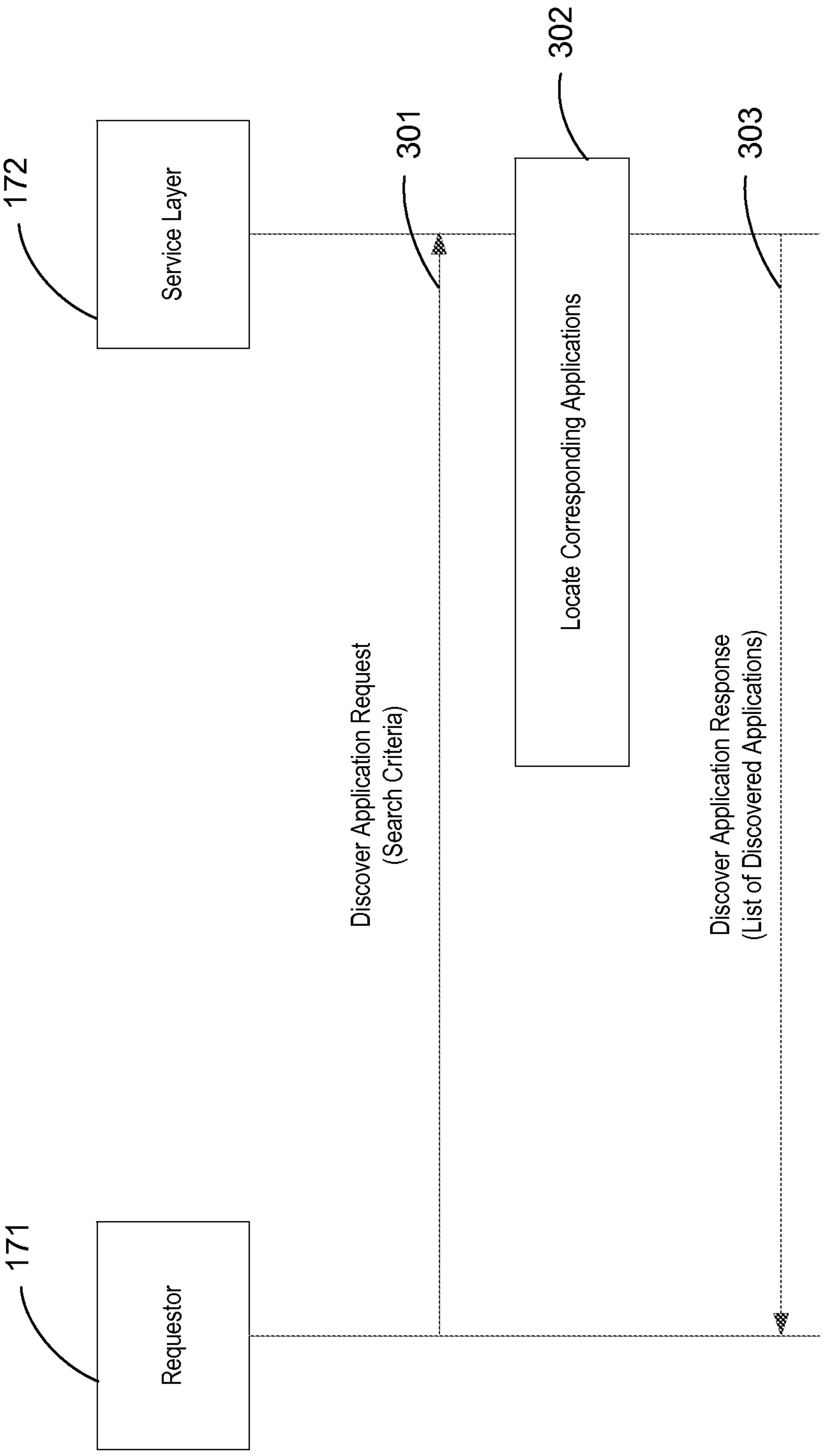
FIG. 20 illustrates an exemplary method for relationship-aware application discovery.

FIG. 20 illustrates an exemplary procedure for application discovery in the context of being relationship-aware. At step 301, requestor 171 may send a request to discover an application (e.g., discover application request) to service layer 172. The discover application request of step 301 may include search criteria such as: discovering parent applications of a particular application; discovering child applications of a particular application; discovering input applications of a particular application; discovering composite applications of a particular application; discovering applications within a particular application relationship; or discover common applications within a set of application relationships. At step 302, based on the information received in step 301, service layer 172 locates the corresponding applications. At step 303, service layer 172 sends a response to requestor 171. The response of step 303 may contain the list of discovered applications (e.g., their identifiers or names).

Figure 21:
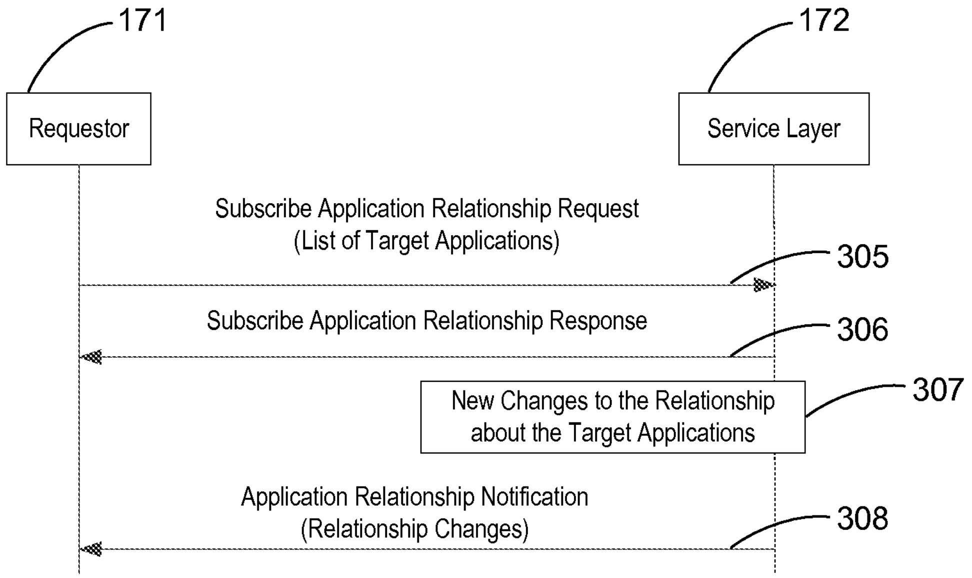
FIG. 21 illustrates an exemplary method for subscription and notification of an application relationship.

FIG. 21 illustrates the procedure for subscription and notification on application relationship, through which an application may receive automatic notification about any new relationship it has with other applications or any changes to its existing relationship with other applications. At step 305, requestor 171 may send a request to subscribe based on application relationship (e.g., subscribe application relationship request) to service layer 172. The request of step 305 may contain a list of target applications (e.g., their identifiers or names). At step 306, service layer 172 may send a subscribe application relationship response message to requestor 307 to indicate if the subscription request is approved or not. At step 307, after a certain amount of time, a relationship about or related to the target applications is changed. For example, a new relationship may be created with one of the target applications in the list of step 305. At step 308, service layer 172 may send an application relationship notification to requestor 171. The notification of step 308 may contain the relationship changes that may occur with regard to step 307.

Figure 22:
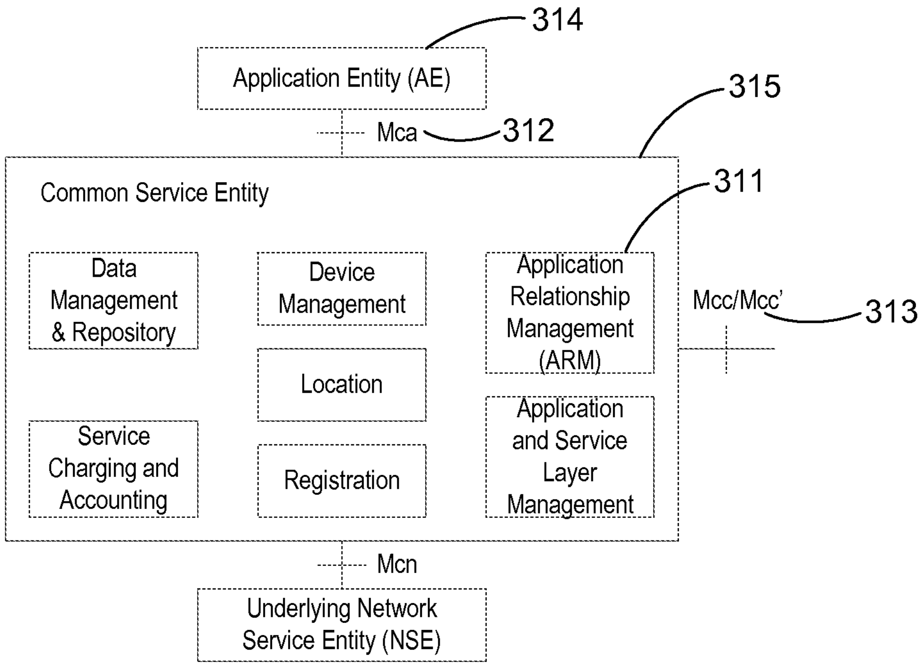
FIG. 22 illustrates application relationship management (ARM) as a CSF.

Disclosed below are additional details with regard to applying or implementing the methods discussed herein in an oneM2M architecture. The methods may be implemented as an oneM2M CSF (e.g., Application Relationship Management (ARM) CSF in FIG. 22). FIG. 22 structure is further detailed below. The "service layer" actor (e.g., service layer 172) in procedures mentioned previously may be replaced with ARM CSF. In other words, the ARM CSF performs the functionalities that were described herein with regard to the service layer. The "requestor" (e.g., requester 171) in procedures mentioned previously may be an oneM2M AE, ARM CSF, or an oneM2M CSE. The methods disclosed herein may affect existing oneM2M reference points (e.g., Mca and Mcc). In other words, the message exchanges may be implemented as a part of oneM2M reference points. For example messages between an application and a service layer (e.g., CSE) may travel over and otherwise involve the Mca reference point. In another example, messages between service layers (e.g., CSEs) may involve the Mcc reference point.

Enhanced application registration services discussed herein may be implemented in a REG CSF to enhance functionality. Software management methods discussed herein may be implemented in a DM CSF or an ASM CSF, for example.

Figure 23:
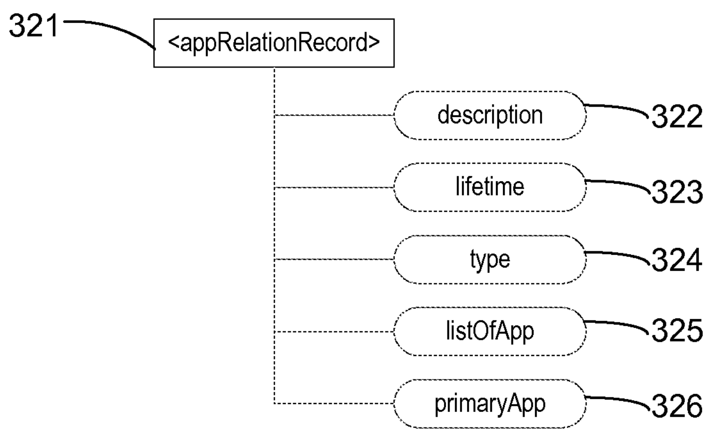
FIG. 23 illustrates an <appRelationRecord> resource structure.

FIG. 23 and FIG. 24 illustrate exemplary resource trees of enhanced or new resources. An application relationship record (e.g., <appRelationRecord> 321) may enable the proposed application relationship management. The <appRelationRecord> 321 may be added as a sub-resource of <application> 331 resource to record application relationships that <application> 331 is involved with. As shown in FIG. 23, <appRelationRecord> 321 may have attributes, such as description 322, lifetime 323, type 324, lifeOfApp 325, and primaryApp 326. A description 322 is an indication of the text description of <appRelationRecord> 321. A lifetime 323 may be an indication of the lifetime of <appRelationRecord> 321. A type 324 may be an indication of the application relationship type of <appRelationRecord> 321 (e.g., parent/child application or composition/input application). A listOfApp 325 may be an indication of the list of applications involved in <appRelationRecord>. The value of this attribute may be the name, label, or identifier of the applications on the list. The primaryApp 326 is an indication the primary application of <appRelationRecord> 321 (e.g., parent application or composite application).

FIG. 24 illustrates an exemplary structure of new <application> 331 resource. The <application> 331 may include a sub-resources or attributes to support the disclosed application management (e.g., application registration, application update, application de-registration, application announcement, and application software management). The <application> 331 may have the attributes arri 333, parentApp 334, childApp 335, siblingApp 336, compositeApp 337, and inputApp 338. The arri 333 may be an indication of the ARRIs that <application> 331 may be involved with. Each arri 333 points to an <appRelationRecord> 321 resource. The parentApp 334 may be an indication of the parent application of this <application> 331 resource, if any. The childApp 335 may be an indication of the child applications of <application> 331 resource, if any. The siblingApp 336 may be an indication of sibling applications of <application> 331 resource, if any. The compositeApp 337 may be an indication of the composite applications of <application> 331 resource, if any. The inputApp 338 may be an indication of the input applications of the <application> 331 resource, if any.

FIG. 25 illustrates another exemplary structure of the disclosed hierarchical <application> structure. The <application> 342 stands for an application. The lifetime 343 may be an indication the lifetime of the application relationship type between <application> 341 and <sub-application> 345. The type 344 may be an indication of the application relationship type between <application> 341 (a first application) and <sub-application> 344. A<sub-application> 345 indicates child applications (if type="parent/child relationship") or input applications (if type="composition/input Relationship") of <application> 341. The <application> 341 may have multiple <sub-application> as its sub-resource.

With continued reference to FIG. 25, a <sub-application> resource may have another <sub-application> resource (e.g., <sub-application> 346) as its sub-resource. In this case, the <sub-application> may have "type" attribute as explained above. The value of a <sub-application> may be a pointer or URI that links to the real <sub-application> resource. The <sub-application> may have the same structure of <application> 331 as shown in FIG. 24, which includes arri, parentApp, childApp, siblingApp, compositeApp, and inputApp. While the oneM2M architecture with CoAP is described by way of background herein and may be used to illustrate various examples described hereinafter, it is understood that implementations of the examples described hereinafter may vary while remaining within the scope of the present disclosure. One skilled in the art will also recognize that the disclosed examples are not limited to implementations using the oneM2M architecture discussed above, but rather may be implemented in other architectures and systems, such as ETSI M2M, MQTT, and other M2M systems and architectures.

Figure 26:
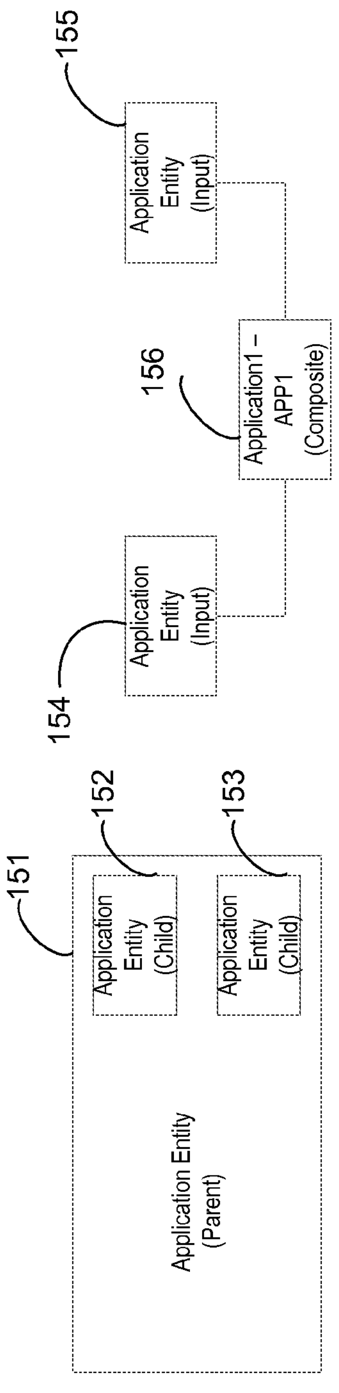
FIG. 26 illustrates an exemplary graphical user interface.

FIG. 26 illustrates an exemplary display (e.g., graphical user interface) that may be generated based on the methods and systems discussed herein. Display interface 350 (e.g., touch screen display) may provide text in block 352 associated with application relationships, such as the parameters of Table 1, a list of composite or parent applications, or the like. There may be additional information (not shown) with regard to whether a device is a constrained device or simplified interfaces based on whether the device is a constrained device. In another example, progress of any of the steps (e.g., sent messages or success of steps) discussed herein may be displayed in block 352. In addition, graphical output 354 may be displayed on display interface 350. Graphical output 354 may be the topology of devices or applications with regard to the application relationships, a graphical output of the progress of any method or systems discussed herein, or the like.

FIG. 27A is a diagram of an example machine-to-machine (M2M), Internet of Things (IoT), or Web of Things (WoT) communication system 10 in which one or more disclosed examples may be implemented. Generally, M2M technologies provide building blocks for the IoT/WoT, and any M2M device, gateway or service platform may be a component of the IoT/WoT as well as an IoT/WoT service layer, etc.

As shown in FIG. 27A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 27A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Figure 1:
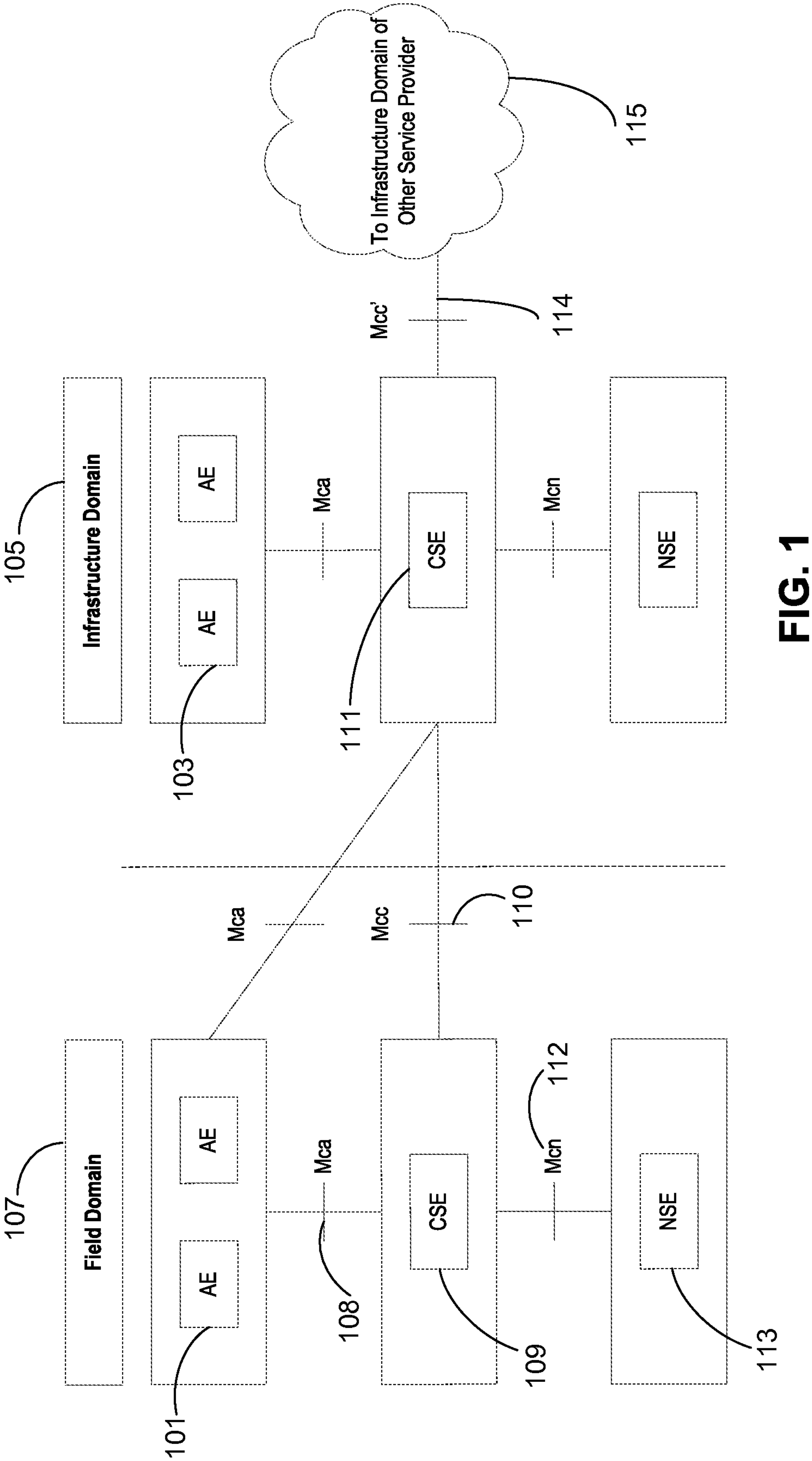
FIG. 1 illustrates an exemplary oneM2M functional architecture.

Referring to FIG. 27B, the illustrated M2M service layer 22 (e.g., CSE 109 of FIG. 1 as described herein) in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Referring also to FIG. 27B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

In some examples, M2M applications 20 and 20' may include parent and child respectively that communicate to a CSE with regard to their application relationship, as discussed herein. The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

The managing of application relationships of the present application may be implemented as part of a service layer. The service layer (e.g., service layer 172) is a software middleware layer that supports value-added service capabilities through a set of application programming interfaces (APIs) and underlying networking interfaces. An M2M entity (e.g., an M2M functional entity such as a device, gateway, or service/platform that may be implemented by a combination of hardware and software) may provide an application or service. Both ETSI M2M and oneM2M use a service layer that may contain the managing of application relationships of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) or a network node (where it is referred to as a network SCL (NSCL)). The oneM2M service layer supports a set of common Service Functions (CSFs) (i.e., service capabilities). An instantiation of a set of one or more particular types of CSFs is referred to as a Common Services Entity (CSE), which can be hosted on different types of network nodes (e.g., infrastructure node, middle node, application-specific node). Further, the managing of application relationships of the present application can implemented as part of an M2M network that uses a Service Oriented Architecture (SOA) or a resource-oriented architecture (ROA) to access services such as managing of application relationships of the present application.

FIG. 27C is a system diagram of an example M2M device 30, such as an M2M terminal device 18 or an M2M gateway device 14 for example. As shown in FIG. 27C, the M2M device 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. It will be appreciated that the M2M device 30 may include any sub-combination of the foregoing elements while remaining consistent with the disclosed subject matter. M2M device 30 (e.g., service layer 172, AE 151, M2M device 281, and others) may be an exemplary implementation that performs the disclosed systems and methods for managing application relationships.

The processor 32 may be a general purpose processor, a special purpose processor, a conventional processor, a digital signal processor (DSP), a plurality of microprocessors, one or more microprocessors in association with a DSP core, a controller, a microcontroller, application specific integrated circuits (ASICs), field programmable gate array (FPGAs) circuits, any other type of integrated circuit (IC), a state machine, and the like. The processor 32 may perform signal coding, data processing, power control, input/output processing, or any other functionality that enables the M2M device 30 to operate in a wireless environment. The processor 32 may be coupled to the transceiver 34, which may be coupled to the transmit/receive element 36. While FIG. 27C depicts the processor 32 and the transceiver 34 as separate components, it will be appreciated that the processor 32 and the transceiver 34 may be integrated together in an electronic package or chip. The processor 32 may perform application-layer programs (e.g., browsers) or radio access-layer (RAN) programs or communications. The processor 32 may perform security operations such as authentication, security key agreement, or cryptographic operations, such as at the access-layer or application layer for example.

The transmit/receive element 36 may be configured to transmit signals to, or receive signals from, an M2M service platform 22. For example, the transmit/receive element 36 may be an antenna configured to transmit or receive RF signals. The transmit/receive element 36 may support various networks and air interfaces, such as WLAN, WPAN, cellular, and the like. In an example, the transmit/receive element 36 may be an emitter/detector configured to transmit or receive IR, UV, or visible light signals, for example. In yet another example, the transmit/receive element 36 may be configured to transmit and receive both RF and light signals. It will be appreciated that the transmit/receive element 36 may be configured to transmit or receive any combination of wireless or wired signals.

In addition, although the transmit/receive element 36 is depicted in FIG. 27C as a single element, the M2M device 30 may include any number of transmit/receive elements 36. More specifically, the M2M device 30 may employ MIMO technology. Thus, in an example, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other examples, the processor 32 may access information from, and store data in, memory that is not physically located on the M2M device 30, such as on a server or a home computer. The processor 32 may be configured to control lighting patterns, images, or colors on the display or indicators 42 in response to application relationships (e.g., parent/child relationships or composition/input relationships). For example, some of the lighting patterns, images, or colors on the display may be indicators of managing application relationships such as applicability of an application relationship, successful registration of an application relationship, linking to applicable relationship records, as well as other things with regard to retrieving, updating, deleting, and discovering existing application relationships.

The processor 32 may be configured to control lighting patterns, images, or colors on the display or indicators 42 in response to whether the LMS in some of the examples described herein are successful or unsuccessful (e.g., subscribing to an application relationship, registering an application based on relationship, discovering relationships, etc.), or otherwise indicate a status of application relationships and associated components. The control lighting patterns, images, or colors on the display or indicators 42 may be reflective of the status of any of the method flows or components in the FIG.'s illustrated or discussed herein (e.g., FIG. 6-FIG. 21, etc.). Disclosed herein are messages and procedures of application relationships in M2M. The messages and procedures can be extended to provide interface/API for users to request application relationships and management components via an input source (e.g., speaker/microphone 38, keypad 40, or display/touchpad 42) and request, configure, or query application relationships, among other things that may be displayed on display 42.

The processor 32 may receive power from the power source 48, and may be configured to distribute or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M device 30. It will be appreciated that the M2M device 30 may acquire location information by way of any suitable location-determination method while remaining consistent with an example.

The processor 32 may further be coupled to other peripherals 52, which may include one or more software or hardware modules that provide additional features, functionality or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 27D is a block diagram of an exemplary computing system 90 on which, for example, the M2M service platform 22 of FIG. 27A and FIG. 27B may be implemented. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 or coprocessor 81 may receive, generate, and process data related to the disclosed systems and methods for management of application relationships, such as receiving enhanced application registration (e.g., registration of multiple applications at once).

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIG. 27A and FIG. 27B.

It is understood that any or all of the systems, methods and processes described herein may be embodied in the form of computer executable instructions (i.e., program code) stored on a computer-readable storage medium which instructions, when executed by a machine, such as a computer, server, M2M terminal device, M2M gateway device, or the like, perform or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

Methods, systems, and apparatuses, among other things, as described herein may provide for means for requesting, configuring, or determining, among other things, application relationships. A method, system, computer readable storage medium, or apparatus has means for assisting in the retrieval of software for a first application; means for determining the relationship of the first application to a second application, the second application is a parent application; and means for sending a first message to the second application based on the relationship of the first application to the second application, the message comprising an alert of the retrieval of software for the first application. The second application may be a parent application to the first application. The message may include the relationship of the first application to the second application. The message may include an identifier of the first application or a version of the software. The method, system, computer readable storage medium, or apparatus has means for further operations that may include receiving a notification of most recently installed version of software of the first application. The first application may be an input application to the second application. The message may notify the second application that the first application has installed the retrieved software. The second application may alter a process for handling data from the first application based on a notification that the first application has installed the retrieved software.

A method, system, computer readable storage medium, or apparatus has means for sending a request to create a resource for an application relationship, the request comprising a type of application relationship; and means for receiving a response that confirms creation of the resource for the application relationship, wherein the response comprises an identifier for the resource for the application relationship. The request may further include a list of applications registered with a service layer or a period for the application relationship existed.

A method, system, computer readable storage medium, or apparatus has means for creating a first resource for a first application based on a first registration request; means for creating a second resource for a second application based on a second registration request; means for receiving a first request, the first request comprising a request to create a relationship between the first application and the second application; and means for creating, based on the first request, a relationship between the first application and the second application. The creation of the relationship may include updating the first resource and the second resource. The method, system, computer readable storage medium, or apparatus has means for updating the first resource with a pointer that connects with the second resource, the pointer indicative that the first application is a parent of the second application. The method, system, computer readable storage medium, or apparatus has means for notifying the first application of creation of the relationship between the first application and the second application. The relationship may include a parent/child relationship between the first application and the second application. The relationship may include a composition/input relationship between the first application and the second application. The relationship may include updating a first application relationship attribute within the first resource. The first request may be received on an application relationship management service of a common services entity.

In describing preferred methods, systems, or apparatuses of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

What is claimed:

1. An apparatus for managing an application relationship, the apparatus comprising:
a processor; and
a memory coupled with the processor, the memory stores a common services entity, wherein the common services entity comprising a service layer and an application relationship management service, wherein the memory having stored thereon executable instructions that when executed by the processor cause the processor to effectuate operations comprising:
the service layer performing the steps of:
providing instructions to create a first resource for a first application based on a first registration request received from the first application;
providing instructions to create a second resource for a second application based on a second registration request received from the second application;
providing instructions to create a third resource for a third application having no subscription to the first application based on a third registration request received from the third application;
the application relationship management service performing the steps of:
receiving, from a requestor, a first request, the first request comprising a request to create a relationship between the first application, the second application, and the third application, wherein the first request includes:
relationship information, link to resources, names, labels, or identifiers for the first application, the second application and the third application respectively;
providing instructions based on the first request to the service layer, to create a relationship between the first application as child, the second application, and the third application as parents, wherein the first application is a composite application of the second and third applications, the creation of the relationship comprises updating the first resource, the second resource and the third resource, wherein the first resource is added with a child pointer/input pointer or link that connects to the second resource and the third source, the second resource and the third source are each added with a parent pointer/composite pointer or link that connects to the first resource, and the second resource and the third source are each added with a sibling pointer or link that connects to each other;
updating, by the service layer, an application relationship record, wherein the application relationship record indicates the created relationship between the first application, the second application, and the third application;
sending, from the service layer, a response back to the requester to notify successful creation of parent/child relationship among the first application, the second application, and the third application; and
sending, from the service layer, an application relationship notification to the first application, the second application, and the third application respectively, wherein the respective application relationship notification includes relationship information between the first application, the second application, and the third application.

2. The apparatus of claim 1, wherein the relationship is displayed on a graphical user interface.

3. The apparatus of claim 1, the operations further comprising de-registering from the service layer of the common services entity based on the relationship.

4. The apparatus of claim 1, wherein the creation of the relationship comprises updating a first application relationship attribute within the first resource.

5. The apparatus of claim 1, wherein the apparatus is a machine-to-machine device or a machine-to-machine gateway.

6. A method for managing an application relationship, the method comprising:
using a common services entity, wherein the common services entity comprises a service layer and an application relationship management service;
the service layer performing the steps of:
creating a first resource for a first application based on a first registration request received from the first application;
creating a second resource for a second application based on a second registration request received from the second application;
creating a third resource for a third application having no subscription to the first application based on a third registration request received from the third application;
the application relationship management service performing the steps of:
receiving, from a requestor, a first request, the first request comprising a request to create a relationship between the first application, the second application, and the third application, wherein the first request includes:
relationship information, link to resources, names, labels, or identifiers for the first application, the second application and the third application respectively;
creating, based on the first request provided to the server layer, a relationship between the first application as child, the second application, and the third application as parents, wherein the first application is a composite application of the second and third applications, the creation of the relationship comprises updating the first resource, the second resource and the third resource, wherein the first resource is added with a child pointer/input pointer or link that connects to the second resource and the third source, the second resource and the third source are each added with a parent pointer/composite pointer or link that connects to the first resource, and the second resource and the third source are each added with a sibling pointer or link that connects to each other;
updating, by the service layer, an application relationship record, wherein the application relationship record indicates the created relationship between the first application, the second application, and the third application;
sending, from the service layer, a response back to the requester to notify successful creation of parent/child relationship among the first application, the second application, and the third application; and sending, from the service layer, an application relationship notification to the first application, the second application, and the third application respectively, wherein the respective application relationship notification includes relationship information between the first application, the second application, and the third application.

7. The method of claim 6, wherein the relationship is displayed on a graphical user interface.

8. The method of claim 6, further comprising de-registering from the service layer of the common services entity based on the relationship.

9. The method of claim 6, wherein the creation of the relationship comprises updating a first application relationship attribute within the first resource.

10. The method of claim 6, wherein the relationship is managed by a machine-to-machine gateway.

11. A non-transitory computer readable storage medium comprising computer executable instructions that when executed by a computing device cause said computing device to effectuate operations comprising:

using a common services entity, wherein the common services entity comprises a service layer and an application relationship management service;

the service layer performing the steps of:

creating a first resource for a first application based on a first registration request received from the first application;

creating a second resource for a second application based on a second registration request received from the second application;

creating a third resource for a third application having no subscription to the first application based on a third registration request received from the third application;

the application relationship management service perform the steps of:

receiving, from a requestor, a first request, the first request comprising a request to create a relationship between the first application, the second application, and the third application, wherein the first request includes:

relationship information, link to resources, names, labels, or identifiers for the first application, the second application and the third application respectively;

creating, based on the first request provided to the server layer, a relationship between the first application as child, the second application, and the third application as parents, wherein the first application is a composite application of the second and third applications, the creation of the relationship comprises updating the first resource, the second resource and the third resource, wherein the first resource is added with a child pointer/input pointer or link that connects to the second resource and the third source, the second resource and the third source are each added with a parent pointer/composite pointer or link that connects to the first resource, and the second resource and the third source are each added with a sibling pointer or link that connects to each other;

updating, by the service layer, an application relationship record, wherein the application relationship record indicates the created relationship between the first application, the second application, and the third application;

sending, from the service layer, a response back to the requester to notify successful creation of parent/child relationship among the first application, the second application, and the third application; and sending, from the service layer, an application relationship notification to the first application, the second application, and the third application respectively, wherein the respective application relationship notification includes relationship information between the first application, the second application, and the third application.

12. The non-transitory computer readable storage medium of claim 11, wherein the creation of the relationship comprises updating the first resource and the second resource.

13. The non-transitory computer readable storage medium of claim 12, the operations further comprising updating the first resource with a pointer that connects with the second resource, the pointer indicative that the first application is a parent of the second application.

14. The non-transitory computer readable storage medium of claim 11, wherein the relationship comprises a parent/child relationship between the first application and the second application.

15. The non-transitory computer readable storage medium of claim 11, wherein the relationship comprises a composition/input relationship between the first application and the second application.

* * * * *